United States Patent
Yoshimura et al.

(10) Patent No.: US 9,418,796 B2
(45) Date of Patent: Aug. 16, 2016

(54) ELECTRODE FOIL, CURRENT COLLECTOR, ELECTRODE, AND ELECTRIC ENERGY STORAGE ELEMENT USING SAME

(75) Inventors: Mitsuo Yoshimura, Uenohara (JP); Koji Yoshioka, Koshu (JP)

(73) Assignee: Japan Capacitor Industrial Co., Ltd., Tokyo (JP)

( * ) Notice: Subject to any disclaimer, the term of this patent is extended or adjusted under 35 U.S.C. 154(b) by 0 days.

(21) Appl. No.: 14/000,599

(22) PCT Filed: Feb. 20, 2012

(86) PCT No.: PCT/JP2012/054000
§ 371 (c)(1),
(2), (4) Date: Aug. 20, 2013

(87) PCT Pub. No.: WO2012/115050
PCT Pub. Date: Aug. 30, 2012

(65) Prior Publication Data
US 2013/0330617 A1   Dec. 12, 2013

(30) Foreign Application Priority Data

Feb. 21, 2011 (JP) .................................. 2011-034803
Feb. 9, 2012 (JP) .................................. 2012-026631

(51) Int. Cl.
*H01G 9/042* (2006.01)
*H01G 11/32* (2013.01)
(Continued)

(52) U.S. Cl.
CPC .............. *H01G 11/32* (2013.01); *H01G 9/0425* (2013.01); *H01G 9/15* (2013.01); *H01G 11/06* (2013.01);
(Continued)

(58) Field of Classification Search
None
See application file for complete search history.

(56) References Cited

U.S. PATENT DOCUMENTS

| 6,052,273 A | 4/2000 | Inoue et al. |
| 6,515,847 B1 | 2/2003 | Naraya |

(Continued)

FOREIGN PATENT DOCUMENTS

| CN | 1216074 A | 5/1999 |
| EP | 0905274 A1 | 3/1999 |

(Continued)

OTHER PUBLICATIONS

Nagata, *Aluminum Electrolytic Capacitor With Liquid Electrolyte Cathode*, 2003, (Table of Contents, Chapters 1, 2, 4, 5 and 6).

(Continued)

*Primary Examiner* — Ula C Ruddock
*Assistant Examiner* — Tony Chuo
(74) *Attorney, Agent, or Firm* — McDermott Will & Emery LLP

(57) ABSTRACT

A cathode foil for a solid electrolytic capacitor is designed to increase capacitance, reduce ESR and leakage current, enhance heat resistance, and reduce production costs, while enhancing a power density, realizing rapid charging-discharging, and improving a life property, in an electric energy storage element such as a secondary battery, an electric double layer capacitor and a hybrid capacitor. A cathode foil or a current collector may include a metal foil, a metal layer, a mixed layer containing carbon and a substance composing the metal layer in a mixed state, and a carbon layer consisting substantially of carbon, each formed on the metal foil. The mixed layer is configured to have a composition changing from a state containing substantially only the substance composing the metal layer to a state containing substantially only carbon, in a direction from the metal layer to the carbon layer.

16 Claims, 11 Drawing Sheets

(51) Int. Cl.
  *H01G 11/70* (2013.01)
  *H01M 4/66* (2006.01)
  *H01G 11/06* (2013.01)
  *H01G 11/28* (2013.01)
  *H01G 9/15* (2006.01)
  *H01G 11/34* (2013.01)
  *H01G 11/36* (2013.01)
  *H01G 11/50* (2013.01)
  *H01M 10/0525* (2010.01)

(52) U.S. Cl.
  CPC ............... *H01G 11/28* (2013.01); *H01G 11/70* (2013.01); *H01M 4/661* (2013.01); *H01M 4/663* (2013.01); *H01M 4/666* (2013.01); *H01M 4/667* (2013.01); *H01G 11/34* (2013.01); *H01G 11/36* (2013.01); *H01G 11/50* (2013.01); *H01M 10/0525* (2013.01); *Y02E 60/13* (2013.01); *Y10T 428/24355* (2015.01); *Y10T 428/31678* (2015.04)

(56) References Cited

U.S. PATENT DOCUMENTS

| | | | |
|---|---|---|---|
| 6,519,137 | B1 | 2/2003 | Nitta et al. |
| 7,158,367 | B2 | 1/2007 | Fujimoto et al. |
| 2006/0018078 | A1 | 1/2006 | Fujimoto et al. |
| 2007/0115613 | A1 | 5/2007 | Fujimoto et al. |
| 2008/0218945 | A1 | 9/2008 | Ro et al. |
| 2009/0027832 | A1 | 1/2009 | Aoyama et al. |
| 2009/0126172 | A1 | 5/2009 | Kobayashi et al. |
| 2009/0130564 | A1* | 5/2009 | Shembel .................. 429/232 |
| 2009/0148759 | A1 | 6/2009 | Mitsuda et al. |
| 2011/0200884 | A1* | 8/2011 | Uchida .................. 429/245 |

FOREIGN PATENT DOCUMENTS

| | | | |
|---|---|---|---|
| JP | 63-286334 A | 11/1988 | |
| JP | 64-001220 A | 1/1989 | |
| JP | 02-155162 * | 6/1990 | ............ H01M 4/02 |
| JP | 02-280310 A | 11/1990 | |
| JP | 3-196510 A | 8/1991 | |
| JP | 04-19695 B2 | 3/1992 | |
| JP | 04-71214 A | 3/1992 | |
| JP | 05-013282 A | 1/1993 | |
| JP | 05-74664 A | 3/1993 | |
| JP | 06-005476 A | 1/1994 | |
| JP | 11-250900 A | 9/1999 | |
| JP | 2000-012400 A | 1/2000 | |
| JP | 2000-114108 A | 4/2000 | |
| JP | 2000-509101 A | 7/2000 | |
| JP | 2000-256850 A | 9/2000 | |
| JP | 2001-196270 A | 7/2001 | |
| JP | 3-196510 B2 | 8/2001 | |
| JP | 2001-284178 A | 10/2001 | |
| JP | 2002-299181 A | 10/2002 | |
| JP | 2002-327271 * | 11/2002 | ............ C23C 16/26 |
| JP | 2004-128048 A | 4/2004 | |
| JP | 2004-221512 A | 8/2004 | |
| JP | 2005-109277 A | 4/2005 | |
| JP | 2006-100478 A | 4/2006 | |
| JP | 2006-190878 A | 7/2006 | |
| JP | 2007-19542 A | 1/2007 | |
| JP | 2007-24613 A | 2/2007 | |
| JP | 2007-36282 A | 2/2007 | |
| JP | 2007-95865 A | 4/2007 | |
| JP | 2008-130999 A | 6/2008 | |
| JP | 2008-270092 A | 11/2008 | |
| JP | 2009-049376 A | 3/2009 | |
| JP | 2009-141181 A | 6/2009 | |
| JP | 2009-283275 A | 12/2009 | |
| JP | 2010-109080 A | 5/2010 | |
| JP | 2010-118258 A | 5/2010 | |
| JP | 2010-218971 * | 9/2010 | ............ H01M 4/66 |
| JP | 2010-218971 A | 9/2010 | |
| JP | 2010-287641 A | 12/2010 | |
| JP | 2011-023276 A | 2/2011 | |
| JP | 2011-142100 A | 7/2011 | |
| JP | 2011-258348 * | 12/2011 | ............ H01M 4/133 |
| RU | 2296383 C2 | 3/2007 | |
| WO | WO-00/19468 A1 | 4/2000 | |
| WO | WO-02/39468 A2 | 5/2002 | |
| WO | WO 2009-069250 A1 * | 6/2009 | ............ H01M 4/36 |
| WO | WO-2010/055922 A1 | 5/2010 | |

OTHER PUBLICATIONS

Nichicon Corporation, "General Descriptions of Aluminum Electrolytic Capacitors," Technical Notes, Cat. 8101E-1, English translation retrieved from <http://www.nichicon-us.com/english/products/pdf/aluminum.pdf>, Dec. 2013.

Oohira, "Characteristics and Applications of DLC Films," NTN Technical Review, 2009, No. 77.

Australian Office Action dated Jan. 18, 2016, which issued in Australian Patent Application No. 2012221308.

* cited by examiner

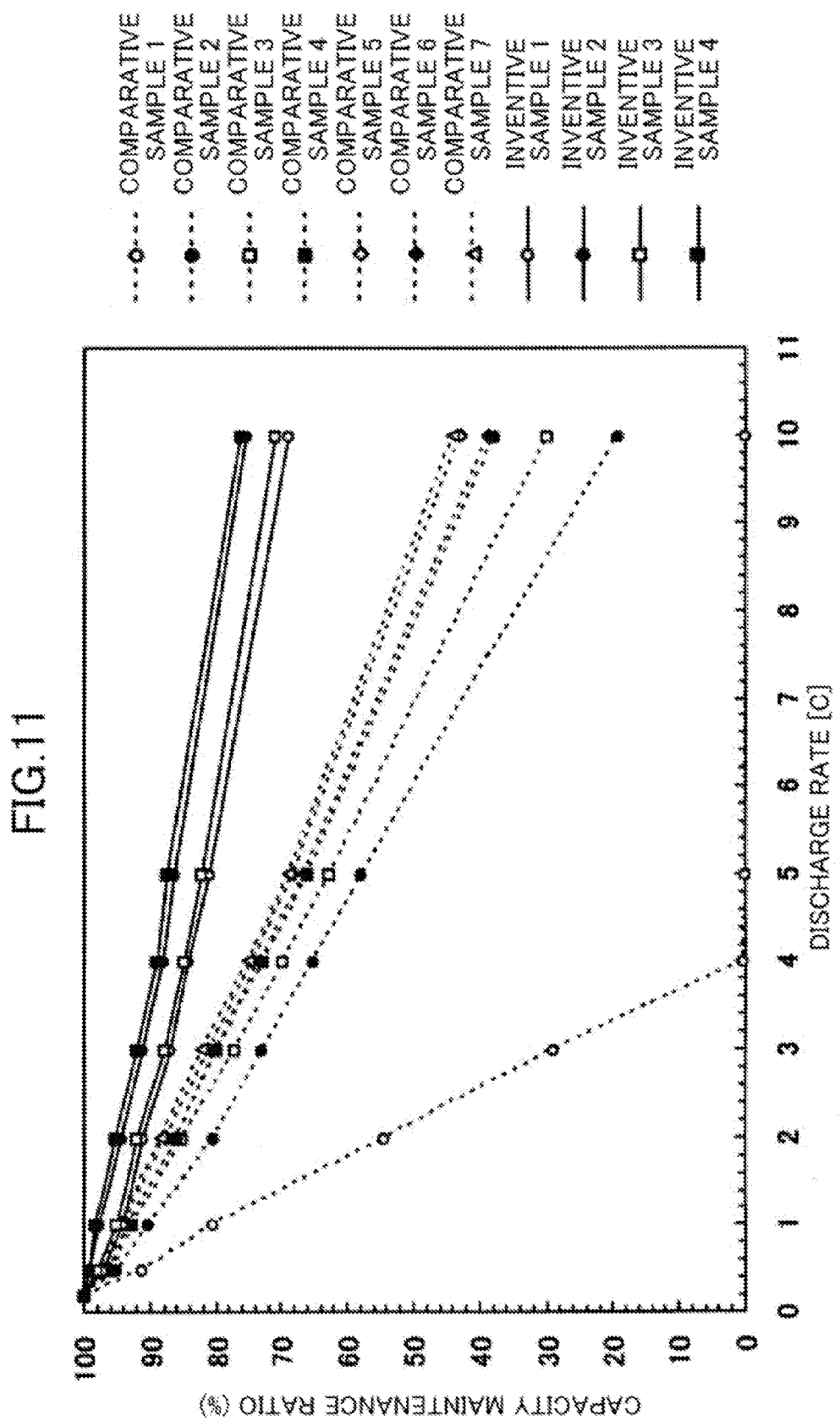

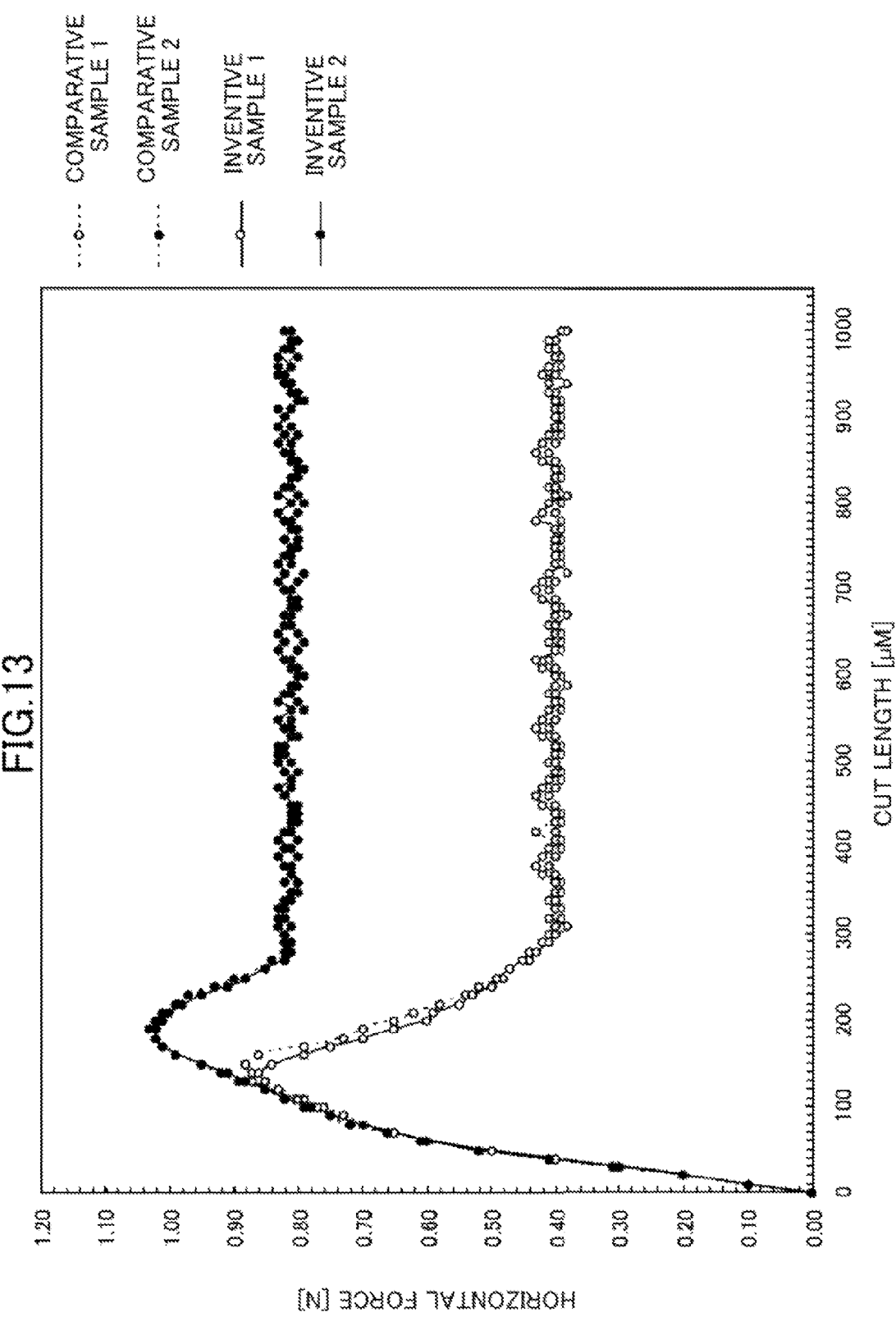

US 9,418,796 B2

ELECTRODE FOIL, CURRENT COLLECTOR, ELECTRODE, AND ELECTRIC ENERGY STORAGE ELEMENT USING SAME

FIELD

The present disclosure relates in general to a solid electrolytic capacitor. The disclosure relates, for example without limitation, to a solid electrolytic capacitor having a solid electrolyte layer (typically, an electrically conductive polymer layer) formed thereinside, and an electrode foil usable in such a type of capacitor. The present disclosure further relates, for example without limitation, to a current collector, an electrode, and an electric energy storage element such as a secondary battery, an electric double layer capacitor or a hybrid capacitor, using the electrode.

BACKGROUND

[Solid Electrolytic Capacitor]

Late years, operating frequencies of electronic devices have become higher and higher. Along with this trend, an electrolytic capacitor as one electronic component also needs to be provided as a product having excellent impedance properties in a higher operating frequency range than before. In order to cope with the need, various solid electrolytic capacitors using, as a solid electrolyte, an electrically conductive polymer with a high electrical conductivity, have been developed. This type of solid electrolytic capacitor is excellent, particularly, in high-frequency properties, in addition to life and temperature properties, and thereby widely employed in electric circuits for personal computers, and others.

In one simplest example, a wound-type solid electrolytic capacitor can be produced by a process comprising a step (i) of: subjecting a surface of an anode aluminum foil to a chemical conversion treatment to form an oxide film thereon; laminating the resulting anode aluminum foil to a cathode aluminum foil through a separator sheet; connecting a lead member to each of the two foils; and winding the laminate to prepare a capacitor element, and a step (ii) of: placing the prepared capacitor element in an aluminum casing; immersing the capacitor element in an electrically conductive polymer solution to cause thermal polymerization of an electrically conductive polymer under heating to form a solid electrically conductive polymer layer between the two foils. When the anode aluminum foil is used as an anode, and the cathode aluminum foil and the electrically conductive polymer layer electrically connected to the cathode aluminum foil are used as a cathode, the anode and the cathode are connected through the electrically insulating oxide film, so that it becomes possible to achieve charge and discharge between the anode and cathode.

In the above solid electrolytic capacitor, the cathode aluminum foil is not subjected to a chemical conversion treatment, so that no artificially formed oxide film exists thereon. However, actually, an oxide film is also formed on the cathode aluminum foil, due to natural oxidation during production or use. In this case, the solid electrolytic capacitor is generally formed in a layered structure comprising (i) the anode aluminum foil, (ii) the oxide film on the anode aluminum foil, (iii) the electrically conductive layer, (iv) the natural oxide film on the cathode aluminum foil, and (v) the cathode aluminum foil. This is equivalent to a state in which two capacitors are connected in series to each other, which causes a problem that a capacitance of the solid electrolytic capacitor as a whole is reduced.

In order to cope with this problem, researches have been conducted to prevent a capacitance component from being generated in a cathode to thereby allow an increase in capacitance of a capacitor. In this connection, some cathode foils obtained from the conventional researches and a problem involved in the conventional cathode foils will be described later.

SUMMARY

One or more implementations of the subject disclosure are substantially illustrated by and/or described in connection with at least one of the figures, as set forth more completely in the claims.

BRIEF DESCRIPTION OF THE DRAWINGS

FIG. 11 illustrates a comparison result of discharge rate properties measured in respective samples of a lithium ion secondary battery using a current collector according to one or more implementations of the present disclosure and a lithium ion secondary battery using a current collector as a comparative sample.

FIG. 13 illustrates a SAICAS test result which compares current collector-electrode layer adhesion strengths measured in respective samples of a positive electrode for a lithium ion secondary battery using a current collector according to one or more implementations of the present disclosure and a positive electrode for a lithium ion secondary battery using a current collector as a comparative sample.

DETAILED DESCRIPTION

[Solid Electrolytic Capacitor]

Figure 1:
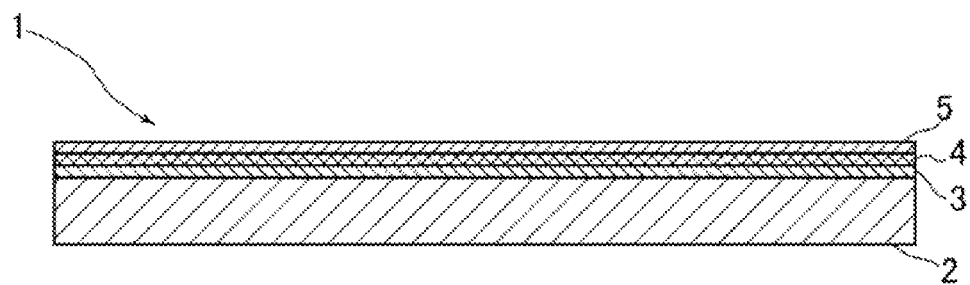
FIG. 1 is a sectional view illustrating a layered structure of a cathode foil according to one or more implementations of the present disclosure.

First and second approaches utilize a cathode foil obtained by forming a chemical conversion coating film on a surface of a cathode aluminum foil, and further forming a metal nitride such as TiN, or a metal carbide such as TiC, on the chemical conversion coating film by vapor deposition. However, a metal such as Ti, and a nitride or carbide thereof, are insufficient in resistance to thermal oxidation. Thus, in the cathode foil, a problem occurs that an oxide film will grow through a heat treatment included in a capacitor production process, resulting in generation of a capacitance component, and increase in ESR (Equivalent Series Resistance).

A third approach utilizes a cathode foil obtained by forming a carbon film on a surface of a metal having a valve function. However, when a carbon film is directly formed on a metal foil such as an aluminum foil, a problem occurs that an ESR is increased due to poor adhesion between the metal foil and the carbon film.

A fourth approach utilizes a cathode foil obtained by forming a carbon-containing layer on a surface of an aluminum foil, wherein an intervening layer consisting of fibrous or filamentous aluminum carbide ($Al_4C_3$, aluminum carbide whisker) is formed between the surface of the aluminum foil and the carbon-containing layer to provide enhanced adhesion therebetween. However, in this cathode foil, the carbon-containing layer is a layer consisting of carbon in the form of particles, so that the surface of the aluminum foil and the carbon-containing layer come into point contact with each other. Thus, there is a problem that an interfacial resistance is increased due to the small contact area. Further, the carbon-containing layer is formed by a process of applying a carbon-containing substance on the surface of the aluminum foil and fixedly attaching carbon particles thereonto through a thermally drying treatment, which causes difficulty in forming the carbon-containing layer to have a sufficiently small thickness, and also gives rise to a problem that an electron transfer distance between the Al layer and a solid electrolyte layer becomes longer, thereby causing an increase in ESR. Moreover, this cathode foil is insufficient in water resisting property (water resistance), and, particularly in high-temperature environments, a problem occurs that the aluminum carbide whisker as an electron transfer pathway is cut, causing deterioration in electrical conductivity.

A fifth approach utilizes a cathode foil obtained by forming, by a vacuum vapor deposition method, a Ni layer on a roughened surface of an aluminum foil. According to this fifth approach, a Ni oxide film formed on a surface of the Ni layer is a semiconductor, i.e., has electrical conductivity, which makes it possible to realize a lower ERS in a capacitor. However, deterioration in electrical conductivity due to formation of the oxide film cannot be negligible, and a semiconductor is inadequate as a film component substance. It is desirable that at least a top layer of the film is formed using an electrically conductive substance excellent in oxidation resisting property (oxidation resistance).

As another type of cathode foil for use in an electrolytic capacitor configured to operate using a driving electrolytic solution, instead of a solid electrolyte, a sixth approach utilizes a cathode foil obtained by vapor-depositing a metal such as Ti on a roughened surface of an aluminum foil to form a metal film thereon, and further applying thereon a binder having carbon fine particles dispersed thereover, wherein the applied binder is subjected to a heating treatment to fix the carbon fine particles on the metal film. However, in the cathode foil, this sixth approach utilizes a surface of the Ti film is oxidized by the driving electrolytic solution, so that a large resistance is generated in an interface between a layer composed of the Ti film and a layer consisting of carbon, causing an increase in ERS of a capacitor (it should be noted that, in order to suppress an influence of the oxidation of Ti, the cathode foil of this sixth approach is preferably subjected to a surface roughening treatment such as etching). Moreover, supposing that it is used as a solid electrolytic capacitor, an oxide film will grow through a heat treatment included in a capacitor production process, causing an increase in ESR. Further, when the Ti film is joined to carbon by a binder or the like, a large interfacial resistance is also generated in a joined portion, causing an increase in ERS of a capacitor.

It is generally described that, in a solid electrolytic capacitor, when a surface of a cathode foil is appropriately roughened, a contact area with a solid electrolyte becomes larger, and thereby the ESR is reduced. However, the effect is small. Moreover, when a surface of an aluminum substrate is roughened, for example, by an etching treatment, a space occurs between the aluminum substrate and a film formed inside pores resulting from the surface-roughening, so that the surface becomes unstable due to a reaction occurring in the space by a chemical agent and water used in a capacitor production process, and an interface between the aluminum substrate and the film is more likely to be oxidized by oxygen diffusion, thereby causing problems such as an increase in interfacial resistance, and acceleration in degradation of a capacitor. Further, there is another problem that the surface roughening treatment leads to an increase in capacitor production cost.

As above, in the conventional cathode foil where a metal film is formed on an aluminum foil, there is a problem that a surface of the film is oxidized, so that, when an oxidation reaction is progressed due to temporal change or the like, a cathode will have a capacitance. Further, in the conventional cathode foil where a carbon layer is formed on an aluminum foil directly or through a metal film or the like, if adhesion between layers is insufficient, a surface of the aluminum foil or a surface of the metal layer in contact with carbon is oxidized, so that a cathode will have a capacitance. Therefore, a capacitance of a solid electrolytic capacitor as a whole is reduced, as previously mentioned. Moreover, each of the above conventional cathode foils has problems such as an increase in ESR and an increase in cost.

[Secondary Battery, Electric Double Layer Capacitor, Hybrid Capacitor, etc.]

Late years, in view of multi-functionalization of mobile electronic devices, improvement in fuel economy of automobiles and transport and construction vehicles, spread of distributed renewable energy, upgrading and expanding of back-up power supply in case of disaster/emergency, etc., demand for an electric energy storage element to be mounted thereto has become larger over the years. In the electric energy storage element including an electric double layer capacitor, a hybrid capacitor and a secondary battery, there is a need for further enhancing a power density (W/kg, W/L) and life property.

In view of performance such as handling/processing strength and electrical conductivity, productivity, production cost, etc., a current collector composed of a metal foil is used in an electrode constituting the electric energy storage element, in many cases. The electrode is constructed by forming, on a current collector, an electrode layer which comprises an active substance, an electrically conductive assistance and a binder. When adhesion, electrical conductivity and/or chemical stability between the current collector and the electrode layer is insufficient, a satisfactory power density cannot be obtained due to an increase in contact resistance, thereby causing difficulty in rapid charging/discharging. Further, for example, along with a charge-discharge cycle of the electric energy storage element, an interface between the current collector and the electrode layer is likely to be transformed over time due to a chemical change such as oxidation, or the electrode layer is likely to be peeled from the current collector, thereby causing an increase in internal resistance and a reduction in usable life.

In this connection, for example, a seventh approach utilizes a battery obtained by forming a carbon film layer between a current collector and an active substance layer.

However, when the carbon film layer is directly formed on the metal foil, adhesion, electrical conductivity and/or chemical stability between the metal foil and the carbon film layer is insufficient, so that a contact resistance between the current collector and the electrode layer will be gradually increased, which leads to problems, such as a reduction in power density and an increase in internal resistance, thereby causing difficulty in rapid charging/discharging. In addition, there are other related approaches (eighth through eleventh approaches). However, film configurations of these approaches have the same problems.

[One or More Examples of Technical Issues]

In one or more implementations, the present disclosure has been made to solve the above conventional technical problems. Specifically, in a cathode foil for a solid electrolytic capacitor, which is obtained by forming a film on an aluminum foil, one or more implementations of the present disclosure can prevent generation of a capacitance in a cathode by enhancing resistance to oxidation of each layer constituting the film, and adhesion between respective layers. In this type of cathode foil, one or more implementations of the present disclosure can prevent generation of a large interfacial resistance due to a rapid change in composition within the film, thereby allowing a reduction in ESR and LC (Leakage Current) of a capacitor.

Further, with a view to solving the problems in various approaches, including the seventh through eleventh approaches, to minimize an increase in internal resistance over a long period of time and maintain a high power density, thereby allowing rapid charging/discharging and realizing an electric energy storage element excellent in life property, one or more implementations of the present disclosure can enhance adhesion and electrical conductivity between a current collector and an electrode layer, and suppress transformation of an interface between the current collector and the electrode layer due to a chemical change.

[One or More Examples of Implementations]

In order to solve, among others, the above problems, one or more implementations of the present disclosure provide an electrode material which is characterized in that it is constructed by forming, on an electrode substrate, a first electrically conductive layer, a mixed layer containing carbon and a substance composing the first electrically conductive layer in a mixed state, and a second electrically conductive layer consisting substantially of carbon, wherein the mixed layer is configured to have a composition which changes from a state containing substantially only the substance composing the first electrically conductive layer to a state containing substantially only carbon, in a direction from the first electrically conductive layer to the second electrically conductive layer.

In the electrode material provided by one or more implementations of the present disclosure, the mixed layer containing respective components of the first and the second electrically conductive layers in a mixed state is formed between the two electrically conductive layers, so that it becomes possible to enhance adhesion between the substance composing the first electrically conductive layer and the carbon. This feature solves the conventional technical problem that, due to an insufficient adhesion between the carbon and the substance composing the first electrically conductive layer, the substance composing the first electrically conductive layer is oxidized, thereby causing the electrode material to have a capacitance, and further causing an increase in ESR. In addition, the second electrically conductive layer consists substantially of carbon, so that it is excellent in oxidation resistance. Further, in a boundary region with the first electrically conductive layer, the mixed layer contains substantially only the substance composing the first electrically conductive layer, whereas, in a boundary region with the second electrically conductive layer, the mixed layer contains substantially only the carbon. This precludes the problem that a composition of the electrode material rapidly changes in the boundary region, thereby causing generation of a large interfacial resistance.

In the above description, the term "containing substantially only the substance composing the first electrically conductive layer" does not necessarily mean that any component other than the substance composing the first electrically conductive layer is not contained at all. For example, depending on: limitations in production techniques concerning control of each component purity in each layer, and mixing of impurities; and a level of capacitance as an allowable error of the electrode material in each product, an actual composition in the boundary region between the mixed layer and each of the electrically conductive layers can variously change. The same applies to the terms "consisting substantially of carbon" and "containing substantially only carbon".

Further, in the above description, the term "the mixed layer is configured to have a composition which changes from a state containing substantially only the substance composing the first electrically conductive layer to a state containing substantially only carbon, in a direction from the first electrically conductive layer to the second electrically conductive layer" does not necessarily mean that a content rate of carbon in the mixed layer monotonically increases in the direction from the first electrically conductive layer to the second electrically conductive layer. For example, depending on a variation in each component concentration caused by limitations in production techniques, an actual composition at each position within the mixed layer can variously change. However, it is preferable that the mixed layer is formed to allow the carbon content rate to continuously increase in the direction from the first electrically conductive layer to the second electrically conductive layer.

The first electrically conductive layer may contain at least one selected from the group consisting of Ta, Ti, Cr, Al, Nb, V, W, Hf, Cu, nitrides of the metals and carbides of the metals. A substance usable in the first electrically conductive layer constituting an electrode material of the present disclosure is not limited to the above substances. However, in the case where an aluminum substrate is used as the electrode substrate, in view of energy efficiency and adhesion with the aluminum substrate, it is preferable to use the above cited substances, and particularly to use a metal including Ti and Al (as long as adhesion with the substrate or electrical conductivity in the first electrically conductive layer is impaired, a plurality of elements such as an alloy may be contained). It should be understood that a material usable as the electrode substrate is not limited to aluminum, but may be any suitable material, such as: Ta, Ti or Nb as a valve-functional metal; or an aluminum alloy prepared by adding any of such materials to aluminum.

According to one or more implementations, in the electrode material of the present disclosure, it is not an essential requirement to roughen a surface of the electrode substrate. As described in aftermentioned Examples based on performance test data, even if an electrode substrate is not subjected to surface roughening during preparation of the electrode material of the present disclosure, a solid electrolytic capacitor using the electrode substrate has excellent capacitance, ESR and leakage current properties, than before. In particular, the aftermentioned Examples show that the electrode substrate of the present disclosure prepared without subjecting an electrode substrate to surface roughening has excellent heat resisting property (heat resistance), as compared to an electrode material with a surface-roughened electrode substrate.

In one or more implementations, the present disclosure also provides a solid electrolytic capacitor which comprises an anode foil, a cathode foil, a separator provided between the anode and cathode foils, and a solid electrolyte layer formed between the anode and cathode foils. The solid electrolytic capacitor is characterized in that the aforementioned electrode material is used as the cathode foil.

In one or more implementations, the electrode material of the present disclosure is particularly suitable for use as a cathode foil in a wound-type or stacked-type solid electrolytic capacitor. Other than that, it is usable in various capacitors including an electrolytic capacitor configured to operate using an electrolytic solution, an electric double layer capacitor, a lithium ion capacitor, a lithium ion battery, a solar battery and others.

Specifically, in one or more implementations, the electrode material of the present disclosure may be modified by additionally forming a layer consisting of activated carbon, on the second electrically conductive layer consisting substantially of carbon. The resulting electrode material can be used as a positive or negative electrode for an electric double layer capacitor (the modified electrode material having this configuration can be used as a positive electrode of a lithium ion capacitor without any change). Further, in one or more implementations, the electrode material of the present disclosure may be modified by additionally forming a layer consisting of a Li-containing active substance, on the second electrically conductive layer. The resulting electrode material can be used as a positive electrode of a lithium ion battery.

That is, in one or more implementations, the electrode material of the present disclosure may be used as an electrode as it is, or may be used as an anode or cathode (positive or negative electrode) of any storage device in an additionally-modified state, if necessary, such as in a state wherein an additional layer is formed as described above.

The solid electrolyte layer may contain at least one selected from the group consisting of manganese dioxide ($MnO_2$), tetracyanoquinodimethane (TCNQ), polyethylenedioxythiophene (PEDOT), polyaniline (PANI) and polypyrrole. However, any suitable electrolyte other than them may also be used. As one example, formation of a solid electrolyte layer consisting of PEDOT may be performed by heating a capacitor element while immersing it in a mixed solution of 3,4-ethylenedioxythiophene and p-toluenesulfonic acid iron(II) salt, to thermally polymerize an electrolyte.

As one or more implementations of the electrode material, the present disclosure provides a cathode foil for use in a solid electrolytic capacitor having a capacitor element which comprises an anode foil, a cathode foil, a separator provided between the anode and cathode foils, and a solid electrically conductive polymer layer formed between the anode and cathode foils. The cathode foil is characterized in that it comprises: an aluminum foil having a non-roughened surface; a metal layer formed on the aluminum foil and consisting substantially of Ti or Al; a mixed layer formed on the metal layer and containing carbon and Ti or Al in a mixed state; and a carbon layer formed on the mixed layer and consisting substantially of carbon, wherein the mixed layer is configured to have a composition which changes from a state containing substantially only Ti or Al to a state containing substantially only the carbon, in a direction from the metal layer to the carbon layer.

This cathode foil corresponds to one or more typical implementations of the present disclosure which will be described in the aftermentioned Examples based on performance test data. However, it is apparent that an implementation for solving the aforementioned conventional technical problems is not limited thereto.

For example, as is evident from aftermentioned performance tests, even when an aluminum substrate in the cathode foil of the present disclosure has a roughened surface, a solid electrolytic capacitor using it has excellent properties than before, in terms of capacitance, etc., and a material usable as the electrode substrate is not limited to aluminum, as previously mentioned. With regard to a material for use in the metal layer, it is also preferable to use Ti or Al, in view of adhesion with aluminum. However, any other material having excellent adhesion with aluminum, such as Ta or Cr, may also be used. Further, when an electrode substrate made of a different material is used, the metal layer may be formed using a material suitable for the substrate. For example, when a cupper foil is used as the electrode material, a metal layer consisting of Cr having excellent adhesion with the cupper foil may be formed, for example, by ion plating. In this case, it is assumed that Cr penetrates through a natural oxide film on a surface of the copper foil and binds directly to the copper foil, and that this provides high electrical conductivity while suppressing generation of a capacitance component, whereby it becomes possible to obtain the same properties as those in the case where the metal layer consisting of Ti or Al is formed on an aluminum foil.

According to one or more implementations, in the cathode foil of the present disclosure, the mixed layer containing respective components of the metal layer and the carbon layer in a mixed state is formed between the two layers. It is apparent that enhancement in metal-carbon adhesion based on introduction of the above mixed layer can be obtained in the same manner as that in the case where the metal layer is formed using a material other than Ti or Al, and it is assumed that the enhanced adhesion makes it possible to prevent formation of an oxide film on the metal and suppress generation of a capacitance in the cathode foil. Further, in a boundary region with the metal layer, the mixed layer contains substantially only Ti or Al, whereas, in a boundary region with the carbon layer, the mixed layer contains substantially only the carbon. Thus, it is apparent that the effect of preventing rapid composition changes in the boundary regions to suppress an interfacial resistance at a low level can be obtained in the same manner as that in the case where the metal layer is formed using a material other than Ti or Al.

Further, in order to solve the problems in various approaches, including the seventh through eleventh approaches, in one or more implementations, the present disclosure provides a current collector for an electrode, which is characterized in that it is constructed by forming, on a substrate containing a metal, a first electrically conductive layer containing a metal, a mixed layer containing carbon and a substance composing the first electrically conductive layer containing a metal in a mixed state, and a second electrically conductive layer consisting substantially of carbon, wherein the mixed layer is configured to have a composition which changes from a state containing substantially only the substance composing the first electrically conductive layer containing a metal to a state containing substantially only carbon, in a direction from the first electrically conductive layer containing a metal to the second electrically conductive layer.

According to one or more implementations, in the current collector provided by the present disclosure, the first electrically conductive layer containing a metal and the mixed layer containing respective components of the first electrically conductive layer containing a metal and the second electrically conductive layer consisting substantially of carbon, in a mixed state, are formed between the surface of the substrate containing a metal and the second electrically conductive layer, so that it becomes possible to enhance adhesion between the substrate and the first electrically conductive layer, and adhesion between the first electrically conductive layer and the second electrically conductive layer, thereby enhancing electrical conductivity and chemical stability in each interface. This feature solves the conventional technical problem that, due to insufficiency of adhesion between the substrate and the carbon and insufficiency of electrical conductivity in an interface and chemical stability in an interface, a contact resistance between the current collector and the electrode layer is increased, and, along with repeated use, an internal resistance of the current collector is increased, causing a reduction in power density of the electrode. In addition, the second electrically conductive layer consists substantially of carbon, so that it is excellent in electrical conductivity and in resistance against a chemical change such as oxidation. Further, in a boundary region with each of the first and second electrically conductive layers, a region of the mixed layer on the side of the first electrically conductive layer contains only the substance composing the first electrically conductive layer, whereas, a region of the mixed layer on the side of the second electrically conductive layer contains substantially only the carbon. This precludes the problem that a rapid composition change occurs in the boundary region, thereby causing generation of a large interfacial resistance.

In the above description, the term "containing substantially only the substance composing the first electrically conductive layer containing a metal" does not necessarily mean that any component other than the substance composing the first electrically conductive layer containing a metal is not contained at all. For example, depending on: limitations in production techniques concerning control of each component purity in each layer, and mixing of impurities; and a level of adhesion or contact resistance as an allowable error of the current collector in each product, an actual composition in the boundary region between the mixed layer and each of the electrically conductive layers can variously change. The same applies to the terms "consisting substantially of carbon" and "containing substantially only carbon".

Further, in the above description, the term "the mixed layer is configured to have a composition which changes from a state containing substantially only the substance composing the first electrically conductive layer containing a metal to a state containing substantially only carbon, in a direction from the first electrically conductive layer containing a metal to the second electrically conductive layer" does not necessarily mean that a content rate of carbon in the mixed layer monotonically increases in the direction from the first electrically conductive layer to the second electrically conductive layer. For example, depending on a variation in each component concentration caused by limitations in production techniques, an actual composition at each position within the mixed layer can variously change. However, it is preferable that the mixed layer is formed to allow the carbon content rate to continuously increase in the direction from the first electrically conductive layer to the second electrically conductive layer.

The first electrically conductive layer may contain at least one selected from the group consisting of Ta, Ti, Cr, Al, Nb, V, W, Hf, Cu, nitrides of the metals and carbides of the metals. A substance usable in the first electrically conductive layer constituting the current collector of the present disclosure is not limited to the above substances. However, in the case where an aluminum foil is used as the substrate containing a metal, in view of energy efficiency and adhesion with the aluminum foil, it is preferable to use the above cited substances, and particularly to use a metal including Ti and Al (as long as adhesion with the substrate or electrical conductivity in the first electrically conductive layer is impaired, a plurality of elements such as an alloy may be contained).

Carbon for use in the second electrically conductive layer is not particularly limited. However, in view of increasing a power density of an electric energy storage element, it is preferable to use graphite-like carbon which is particularly excellent in electrical conductivity among carbon materials. It is also preferable to use it in view of production cost. As used here, the term "graphite-like carbon" means carbon having an amorphous structure in which two types of bonds: diamond bond (carbon-carbon bond based on $sp^3$ hybridized orbital); and graphite bond (carbon-carbon bond based on $sp^2$ hybridized orbital), exist in a mixed state, wherein a rate of the graphite bond is over one-half. However, in addition to the amorphous structure, a phase having a crystal structure partially composed of a graphite structure (i.e., hexagonal crystal structure composed of $sp^2$ hybridized orbital-based bonds).

A material usable as the substrate containing a metal is not limited to aluminum, but may be a metal foil made of any suitable material, such as: Ti, Cu, Ni, Hf, or stainless steel, or an aluminum alloy prepared by adding any of such materials to aluminum. A metal foil as a current collector for use in a positive electrode and a negative electrode of each electric energy storage element is selected in view of electrochemical stability, electrical conductivity, weight, processability, production cost and others, while considering an electrolyte and an operating potential of an active substance. When the electric energy storage element is an electric double layer capacitor, it is preferable to use an aluminum foil for both positive and negative electrodes. When it is a hybrid capacitor or a secondary battery, it is preferable to use an aluminum foil for a positive electrode and use an aluminum or copper foil for a negative electrode.

According to one or more implementations, in the current collector of the present disclosure, it is not an essential requirement to roughen a surface of the substrate containing a metal. However, as described in the aftermentioned Examples based on performance test data, when the substrate is subjected to surface roughening during preparation of the current collector of the present disclosure, adhesion between the current collector and the electrode layer and collection capability are enhanced, which is more advantageous to enhancement in power density and life property. This comes largely from enhancement in adhesion strength based on a physical anchor effect between the current collector and the electrode layer, and a contact resistance reduction effect based on an increase in contact area therebetween, in addition to the aforementioned effects of the first electrically conductive layer containing a metal, the mixed layer and the second electrically conductive layer. Particularly, in a hybrid capacitor and a secondary battery where an active substance repeats volume expansion and contraction caused by occlusion (intercalation) and release (deintercalation) of ions, surface-roughening of the substrate is more effective. Means for surface-roughening is not limited. However, when an aluminum or copper foil is used as a material for the substrate, as mentioned above, it is preferable to perform the surface-roughening, for example, by chemical or electrochemical etching using an acid or alkaline solution, which is a method capable of facilitating achieving a porous structure effective for enhancing adhesion based on an anchor effect with the electrode layer, and excellent in productivity. In a hybrid capacitor such as a lithium ion capacitor, and a secondary battery such as a lithium ion secondary battery, when it is necessary to perform a pre-dope operation of allowing alkali metal ions or alkaline-earth metal ions to be evenly occluded in an active substance of a positive electrode and/or a negative electrode in the electric energy storage element, a through-hole may be provided in the metal foil, depending on a type of production technique, and production convenience.

A total thickness of layers including the mixed layer from the first electrically conductive layer to the second electrically conductive layer is not particularly limited. For example, this thickness may be set to 45 nm or less. In this case, it becomes possible to prevent an electron transfer distance between the current collector and the electrode layer from becoming longer, thereby further enhancing the internal resistance reducing effect. Particularly, when the metal foil is subjected to surface-roughening, the current collector may be prepared to allow the total thickness to become smaller. This makes it possible to prevent a film formed on the current collector from filling a fine and delicate porous structure formed in the metal foil by etching or the like, and impairing the anchor effect and the contact area increasing effect, and evenly form the first and second electrically conductive layer on an inner wall having the porous structure. In the case where the current collector is used in a negative electrode of a hybrid capacitor or a secondary battery, carbon itself composing the second electrically conductive layer can serve as an active substance capable of occluding and releasing alkali metal ions or alkaline-earth metal ions. In this case, in order to obtain sufficient energy density (Wh/kg, Wh/L) as an electric energy storage element, an active substance-containing electrode layer is required to have a layer thickness of at least 1 μm or more. However, in view of productively, production cost, etc., it is undesirable to form the second electrically conductive layer to have a thickness of about 1 μm, for the purpose of using it as an active substance. According to one or more implementations, an active substance-containing electrode layer is preferably formed as a separate layer from the second electrically conductive layer constituting the current collector of the present disclosure.

According to one or more implementations, the present disclosure provides a secondary battery, such as a lithium ion secondary battery, a sodium ion secondary battery, a magnesium ion secondary battery or a calcium ion secondary battery, which comprises: a positive electrode formed with an electrode layer comprising an active substance including a transition metal oxide or transition metal phosphate compound containing an alkali metal or an alkali earth metal, an electrically conductive assistant, and a binder; and a negative electrode formed with an electrode layer comprising an active substance including at least one selected from the group consisting of a carbon material capable of occluding and releasing an alkali metal ion or alkali earth metal ion, Sn, Si or silicon oxide, S or sulfide, and titanium oxide, an electrically conductive assistant, and a binder. The secondary battery is characterized in that it comprises an electrode using the above current collector, wherein the electrode is used as the positive electrode and the negative electrode. In this case, for example, the transition metal oxide or transition metal phosphate compound containing an alkali metal or an alkali earth metal, which is included in the active substance of the positive electrode used in the above secondary battery, includes $LiCoO_2$, $LiMn_2O_4$, $LiNiO_2$, $Li(Ni-Mn-Co)O_2$, $Li(Ni-Co-Al)O_2$, $LiFePO_4$, $NaCrO_2$, $NaFeO_2$, $MgHf(MoO_4)_3$, $Ca_3Co_2O_6$ and $Ca_3CoMnO_6$.

According to one or more implementations, the present disclosure provides an electric double layer capacitor using: a positive electrode formed with an electrode layer comprising an active substance including activated carbon or carbon nanotube, an electrically conductive assistant, and a binder; and a negative electrode formed with the same layered structure. The electric double layer capacitor is characterized in that it comprises an electrode using the above current collector, wherein the electrode is used as the positive electrode and the negative electrode.

Further, according to one or more implementations, the present disclosure provides a hybrid capacitor, such as a lithium ion capacitor, which comprises a positive electrode formed with an electrode layer comprising an active substance including activated carbon or carbon nanotube, an electrically conductive assistant, and a binder; and a negative electrode formed with an electrode layer comprising an active substance including at least one selected from the group consisting of a carbon material capable of occluding and releasing an alkali metal ion or alkali earth metal ion, Sn, Si or silicon oxide, S or sulfide, and titanium oxide, an electrically conductive assistant, and a binder. The hybrid capacitor is characterized in that it comprises an electrode using the above current collector, wherein the electrode is used as the positive electrode and the negative electrode.

[One or More Examples of Implementations]

According to one or more implementations, in the electrode material of the present disclosure, interlayer adhesion is enhanced by forming the mixed layer between the first and second electrically conductive layers formed on the electrode substrate, so that it becomes possible to prevent oxidation of the substance composing the first electrically conductive layer. In addition, in a boundary region between the mixed layer and each of the first and second electrically conductive layers, the mixed layer consists substantially only of a component of a respective one of the first and second electrically conductive layers, which precludes an increase in interfacial resistance due to a rapid change in composition of the electrode material in the boundary region. The use of this electrode material as a cathode foil allows a solid electrolytic capacitor to achieve an increase in capacitance and a reduction in ESR and leakage current.

In addition, as shown by the aftermentioned performance test data, according to one or more implementations, the electrode material of the present disclosure is extremely excellent in heat resistance, so that it is almost free of quality deterioration even after used under high temperature for a long period of time. Further, according to one or more implementations, even when a thickness of a film composed of the first electrically conductive layer, the mixed layer and the second electrically conductive layer and formed on an aluminum substrate is reduced to about 0.02 μm, almost no deterioration in properties of a cathode foil in the electrode material of the present disclosure is observed, and, during preparation of the cathode foil, there is no need for roughening a surface of the electrode substrate, so that it becomes possible to reduce a material to be used, and simplify a production process, thereby significantly reducing a production cost. When the film is formed to have such a reduced thickness, it becomes to reduce a risk that crack occurs during winding of the cathode foil. Furthermore, when the film is formed to have such a reduced thickness, an electron transfer distance between the electrode substrate and the solid electrolyte is reduced, so that it becomes possible to further reduce the ESR.

According to one or more implementations, in the current collector of the present disclosure, interlayer adhesion and electrical conductivity, and chemical stability, are enhanced by forming the mixed layer between the first and second electrically conductive layers formed on the electrode substrate, so that it becomes possible to prevent transformation due to a chemical change such as oxidation, in each of the surface of the substrate and the substance composing the first electrically conductive layer. In addition, in a boundary region between the mixed layer and each of the first and second electrically conductive layers, the mixed layer consists substantially only of a component of a respective one of the first and second electrically conductive layers, which precludes an increase in interfacial resistance due to a rapid change in composition of the electrode material in the boundary region. A positive or negative electrode obtained by forming, on the above current collector, an electrode layer comprising an active substance, an electrically conductive assistant and a binder is excellent in electrical conductivity, collection capability from the electrode layer to the current collector, and chemical stability, and is capable of maintaining high adhesion between the current collector and the electrode layer over a long period of time. In an electric energy storage element such as a secondary battery, an electric double layer capacitor or a hybrid capacitor, using the above electrodes, it becomes possible to enhance a power density, while minimizing a voltage drop during charging/discharging and suppressing a temperature rise of the element during charging/discharging with a large current. Thus, rapid charging/discharging can be continuously performed for a long period of time to achieve a significant extension of a charge-discharge cycle life.

[One or More Implementations]

As one or more implementations of the present disclosure, a cathode foil in which a first electrically conductive layer consisting of Ti or Al, a mixed layer containing carbon and Ti or Al in a mixed state, and a second electrically conductive layer consisting of carbon, are formed on an aluminum foil having a non-roughened surface, and a solid electrolytic capacitor prepared using the cathode foil, will now be described. However, as previously mentioned, according to one or more implementations, each of the aluminum foil used as a substrate and the Ti or Al for forming the first electrically conductive layer can be substituted by other material, and the cathode foil of the present disclosure has excellent properties even when a surface of the substrate is roughened, as described later using performance test data.

Cathode Foil

FIG. 1 is a sectional view illustrating a layered structure of a cathode foil 1 according to one or more implementations. The cathode foil 1 comprises: a plain aluminum foil 2 which is not subjected to surface-roughening by an etching treatment or the like; a metal layer 3 formed on the plain aluminum foil 2 and composed of a metal film consisting of Ti or Al; a mixed layer 4 formed on the metal layer 3 and containing carbon and the Ti or Al in a mixed state; and a carbon layer 5 formed on the mixed layer 4.

As the plain aluminum foil 2, it is possible to use a commercially available high-purity aluminum sheet. A thickness of the aluminum sheet is not particularly limited. However, when used as a cathode foil for a wound-type solid electrolytic capacitor, the aluminum sheet preferably has a thickness of 20 μm to 50 μm.

The metal layer 3 is formed by: placing the plain aluminum foil 2 and a metal material of Ti or Al as a vaporization source, within a vacuum chamber; vaporizing and ionizing Ti or Al, for example, by using electron beam and plasma generation electrodes; and introducing generated positive metal ions to the plain aluminum foil 2. In this process, a negative bias voltage is applied to the plain aluminum foil 2, so that the metal ions directed toward the plain aluminum foil 2 are accelerated to have high energy (ion plating method). Thus, Ti or Al ions penetrates through a natural oxide film formed on the surface of the plain aluminum foil 2 and strongly adheres to the plain aluminum foil 2. In cases where a layer consisting of nitride or carbide of a metal such as Ti or Al is formed on the plain aluminum foil 2, the first electrically conductive layer may be formed by performing the above process, for example, in a nitrogen gas or methane gas atmosphere.

Other than the ion plating method, as a method for forming the metal layer 3, it is possible to use a vacuum vapor deposition method, a chemical vapor deposition (CVD) method or a sputtering method. However, in view of an advantage of being able to allow the metal layer 3 and the plain aluminum foil 2 to strongly adhere to each other through the natural oxide film, thereby suppressing an ESR of a capacitor at a lower level, and an advantage of being able to facilitate formation of a smooth metal film, it is preferable to use the ion plating method.

The mixed layer 4 can be formed, for example, by an ion plating method, as with the metal layer 3. That is, in addition to the metal material of Ti or Al, a carbon material may be provided as a vaporization source to perform a film formation process simultaneously using the two vaporization sources. The introduction of the mixed layer 4 makes it possible to enhance adhesion between the metal and the carbon to thereby prevent formation of an oxide film.

Preferably, the mixed layer 4 is configured such that, in a boundary region with the metal layer 3, it contains substantially only Ti or Al, whereas, in a boundary region with the carbon layer 5, it contains substantially only carbon, wherein it is particularly configured such that a content rate of carbon continuously increases in a direction from the metal layer 3 to the carbon layer 5. As one example, the mixed layer 4 can be formed by: (i) during an initial stage of film formation for the mixed layer 4, irradiating only a metal material with an electron beam to form a film consisting only of Ti or Al; (ii) along with an elapse of time, gradually reducing an irradiation amount of electron beam for the metal material, while increasing an irradiation amount of electron beam for a carbon material, to form a mixed film containing the metal and carbon in a mixed state, wherein a content rate of carbon gradually increases in a direction toward a top of the deposit; and (iii) during a final stage of the film formation, setting the irradiation amount of electron beam for the metal material to zero to form a film consisting only of carbon. On the other hand, when the mixed layer 4 is formed by a sputtering method, the mixed layer 4 having the preferred configuration can be formed by any suitable process, for example, by, along with an elapse of time, gradually reducing a voltage applied to a metal target (gradually reducing a sputtering rate of the metal target), while gradually increasing a voltage applied to a C target (gradually increasing a sputtering rate of the C target).

Incidentally, among the aftermentioned performance test data, data of inventive samples 7 to 12 is measured using a cathode foil 1 obtained by forming a mixed layer 4 using the above ion plating method, particularly, in such a manner as to allow a content rate of carbon to continuously increase in a direction from the metal layer 3 to the carbon layer 5. However, it is assumed that, even if the mixed layer 4 partially has a region where the carbon content rate gradually decreases in the direction toward the carbon layer 5 (this situation can occur due to limits of film forming techniques), it is possible to obtain excellent properties as compared to a conventional cathode foil. This is because, even in such a region, the presence of carbon and Ti or Al in a mixed state provides enhanced adhesion between the two component layers, and therefore prevents oxidation of the Ti or Al layer to suppress generation of an internal capacitance in a cathode. Further, in the cases where the carbon content rate discontinuously changes in a partial region of the mixed layers 4, it is considered that the ESR property is deteriorated to some extent due to an increase in interfacial resistance in the partial region. However, it is assumed that the same properties as a cathode foil can be obtained because the adhesion between the two component layers is enhanced by the presence of carbon and Ti or Al in a mixed state (with regard to this point, see data of inventive samples 1 to 6 among the aftermentioned performance test data).

The carbon layer 5 can be formed, for example, by an ion plating method, as with the metal layer 3 and the mixed layer 4. Typically, the carbon layer 5 can be formed by, after reducing the irradiation amount of electron beam for the metal material to zero in the process of forming the mixed layer 4, continuing the film formation for a given time by successively irradiating only the carbon material with an electron beam.

According to one or more implementations, the carbon layer 5 of the present disclosure is preferably formed using an ion plating method or the like, instead of a method of dispersing carbon fine particles in a binder, and then applying and heating the obtained mixture, as in a cathode foil of the sixth approach. This is because a carbon fine particle layer formed using a binder comes into point contact with a lower Ti or Al layer, causing an increase in interfacial resistance and deterioration in adhesion therebetween. It is desirable to form the carbon layer 5 as a smooth and dense carbon film.

It is sufficient if each of the metal layer 3, the mixed layer 4 and the carbon layer 5 has a thickness of about 0.005 to 0.01 μm. Further, as shown in the aftermentioned performance test, at least when a total thickness of the three layers is 0.02 μm or more, good properties as a cathode foil can be obtained. However, the thickness of each of the layers may further be increased.

Preferably, each of the metal layer 3, the mixed layer 4 and the carbon layer 5 is formed by the same film forming method. This is because a production process can be simplified so as to significantly reduce a production cost. However, each of the layers may be formed by a different method.

Solid Electrolytic Capacitor

Figure 2:
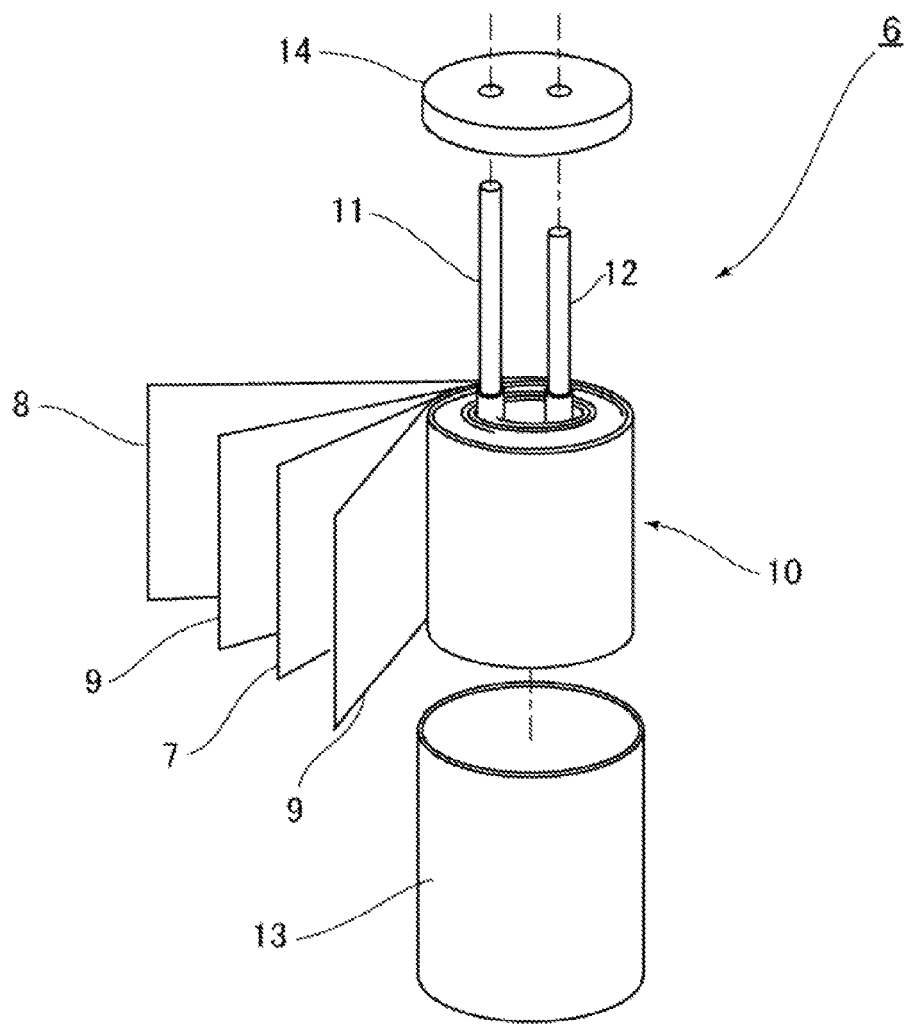
FIG. 2 is an exploded diagram illustrating a structure of a wound-type solid electrolytic capacitor according to one or more implementations of the present disclosure.

FIG. 2 is an exploded diagram of a wound-type solid electrolytic capacitor 6 prepared using the cathode foil 1. The solid electrolytic capacitor 6 is prepared by the following method: (i) after laminating an anode foil 7 obtained by forming an oxide film on an anode aluminum foil through a chemical conversion treatment, to a cathode foil 8 having the layered structure illustrated in FIG. 1, through a separator sheet 9, connecting an anode terminal 11 and a cathode terminal 12, respectively, to the anode foil 7 and the cathode foil 8, and winding the laminate to prepare a capacitor element 10; and (ii) after inserting the capacitor element 10 in an aluminum casing 13, immersing the capacitor element 10 in a mixed solution comprising 3,4-ethylenedioxythiophene and p-toluenesulfonic acid iron(II) salt as an oxidant, and containing n-butyl alcohol as a diluent, to form a solid electrolyte layer of polyethylenedioxythiophene through thermal polymerization under heating. Alternatively, the solid electrolyte layer may be formed using polypyrrole-based or polyaniline-based electrically conductive polymer, or TCNQ complex salt, for example.

Performance Test of Solid Electrolytic Capacitor

As one or more implementations of the cathode foil of the present disclosure, a cathode foil prepared without subjecting an aluminum foil to surface-roughening, as mentioned above, a cathode foil prepared by subjecting an aluminum foil to surface-roughening, intentionally for comparison, a cathode foil prepared by using a Ti layer as a metal layer, a cathode foil prepared by using an Al layer as a metal layer, were provided. Further, in terms of a thickness of a film consisting of a metal layer, a mixed layer and a carbon layer, each of the cathode foils was provided as two types: one having a thickness of 0.5 μm; and the other having a thickness of 0.02 μm. According to one or more implementations, a plurality of wound-type solid electrolytic capacitors each having the configuration illustrated in FIG. 2 were prepared using the various cathode foils of the present disclosure, and subjected to measurements of capacitance, ESR and leakage current. Further, according to one or more implementations, a plurality of wound-type solid electrolytic capacitors each having the same configuration as that of the capacitors of the present disclosure, except that they were prepared using a plurality of types of conventional cathode foils variously different in configuration of a substrate and a film, were subjected to the same measurement. Then, both test results were compared to each other.

According to one or more implementations, a configuration of a cathode foil for use in each of the conventional samples 1 to 16 as solid electrolytic capacitors for comparison and the inventive samples 1 to 12 as solid electrolytic capacitors of the present disclosure, subjected to the measurements, is as follows.

(Conventional Sample 1)

A cathode foil obtained by subjecting a plain aluminum foil to an etching treatment.

(Conventional Sample 2)

A cathode foil obtained by forming a Ti film on a plain aluminum foil to have a thickness of 0.5 μm.

(Conventional Sample 3)

A cathode foil obtained by forming a Ti film on a plain aluminum foil to have a thickness of 0.02 μm.

(Conventional Sample 4)

A cathode foil obtained by forming a TiN film on a plain aluminum foil to have a thickness of 0.5 μm.

(Conventional Sample 5)

A cathode foil obtained by forming a TiN film on a plain aluminum foil to have a thickness of 0.02 µm.

(Conventional Sample 6)

A cathode foil obtained by forming a TiC film on a plain aluminum foil to have a thickness of 0.5 µm.

(Conventional Sample 7)

A cathode foil obtained by forming a TiC film on a plain aluminum foil to have a thickness of 0.02 µm.

(Conventional Sample 8)

A cathode foil obtained by forming a carbon film on a plain aluminum foil to have a thickness of 0.5 µm.

(Conventional Sample 9)

A cathode foil obtained by forming a carbon film on a plain aluminum foil to have a thickness of 0.02 µm.

(Conventional Sample 10)

A cathode foil obtained by forming aluminum carbide on a plain aluminum foil, and then fixedly attaching carbon fine particles thereonto (a thickness of the resulting film varies in the range of 0.5 µm to 1 µm, depending on positions in a surface of the cathode foil).

(Conventional Sample 11)

A cathode foil obtained by subjecting a plain aluminum foil to an etching treatment, and forming a Ti film and a carbon film thereon in this order to have respective thicknesses of 0.25 µm and 0.25 µm.

(Conventional Sample 12)

A cathode foil obtained by subjecting a plain aluminum foil to an etching treatment, and forming a Ti film and a carbon film thereon in this order to have respective thicknesses of 0.01 µm and 0.01 µm.

(Conventional Sample 13)

A cathode foil obtained by forming a Ti film and a carbon film on a plain aluminum foil in this order to have respective thicknesses of 0.25 µm and 0.25 µm.

(Conventional Sample 14)

A cathode foil obtained by forming a Ti film and a carbon film on a plain aluminum foil in this order to have respective thicknesses of 0.01 µm and 0.01 µm.

(Conventional Sample 15)

A cathode foil obtained by forming an Al film on a plain aluminum foil to have a thickness of 0.25 µm, and further forming a carbon film thereon to have a thickness of 0.25 µm.

(Conventional Sample 16)

A cathode foil obtained by forming an Al film on a plain aluminum foil to have a thickness of 0.01 µm, and further forming a carbon film thereon to have a thickness of 0.01 µm.

(Inventive Sample 1)

A cathode foil obtained by subjecting a plain aluminum foil to an etching treatment, and forming a Ti film, a Ti and carbon mixed layer a, and a carbon film, thereon in this order to have respective thicknesses of 0.2 µm, 0.1 µm and 0.2 µm.

(Inventive Sample 2)

A cathode foil obtained by subjecting a plain aluminum foil to an etching treatment, and forming a Ti film, a Ti and carbon mixed layer a, and a carbon film, thereon in this order to have respective thicknesses of 0.008 µm, 0.004 µm and 0.008 µm.

(Inventive Sample 3)

A cathode foil obtained by forming a Ti film, a Ti and carbon mixed layer a, and a carbon film, on a plain aluminum foil in this order to have respective thicknesses of 0.2 µm, 0.1 µm and 0.2 µm.

(Inventive Sample 4)

A cathode foil obtained by forming a Ti film, a Ti and carbon mixed layer a, and a carbon film, on a plain aluminum foil in this order to have respective thicknesses of 0.008 µm, 0.004 µm and 0.008 µm.

(Inventive Sample 5)

A cathode foil obtained by forming an Al film, an Al and carbon mixed layer a, and a carbon film, on a plain aluminum foil in this order to have respective thicknesses of 0.2 µm, 0.1 µm and 0.2 µm.

(Inventive Sample 6)

A cathode foil obtained by forming an Al film, an Al and carbon mixed layer a, and a carbon film, on a plain aluminum foil in this order to have respective thicknesses of 0.008 µm, 0.004 µm and 0.008 µm.

(Inventive Sample 7)

A cathode foil obtained by subjecting a plain aluminum foil to an etching treatment, and forming a Ti film, a Ti and carbon mixed layer b, and a carbon film, thereon in this order to have respective thicknesses of 0.2 µm, 0.1 µm and 0.2 µm.

(Inventive Sample 8)

A cathode foil obtained by subjecting a plain aluminum foil to an etching treatment, and forming a Ti film, a Ti and carbon mixed layer b, and a carbon film, thereon in this order to have respective thicknesses of 0.008 µm, 0.004 µm and 0.008 µm.

(Inventive Sample 9)

A cathode foil obtained by forming a Ti film, a Ti and carbon mixed layer b, and a carbon film, on a plain aluminum foil in this order to have respective thicknesses of 0.2 µm, 0.1 µm and 0.2 µm.

(Inventive Sample 10)

A cathode foil obtained by forming a Ti film, a Ti and carbon mixed layer b, and a carbon film, on a plain aluminum foil in this order to have respective thicknesses of 0.008 µm, 0.004 µm and 0.008 µm.

(Inventive Sample 11)

A cathode foil obtained by forming an Al film, an Al and carbon mixed layer b, and a carbon film, on a plain aluminum foil in this order to have respective thicknesses of 0.2 µm, 0.1 µm and 0.2 µm.

(Inventive Sample 12)

A cathode foil obtained by forming an Al film, an Al and carbon mixed layer b, and a carbon film, on a plain aluminum foil in this order to have respective thicknesses of 0.008 µm, 0.004 µm and 0.008 µm.

Except for the cathode foil of the conventional sample 10, film formation on the substrate in all of the remaining samples was performed by the aforementioned ion plating method. Particularly, formation of titanium nitride and titanium carbide films in the conventional samples 4 to 7 was performed in nitrogen gas and methane gas atmosphere respectively, and using titanium as a vaporization source, and formation of a carbon film in the conventional samples 8 and 9 was performed using carbon as a vaporization source. Film formation in the inventive samples 1 to 12 was performed by the ion plating method, as previously mentioned. Among them, the mixed layer a in the inventive samples 1 to 6 is formed to allow a ratio between carbon and Ti or Al to become constant, whereas the mixed layer b in the inventive samples 7 to 12 is formed to allow a content rate of carbon to become higher in a direction toward a top of the film. In the conventional sample 10, a commercially available product was used.

A result of the performance test is presented in the following Table 1.

TABLE 1

| | Substrate | Film Configuration | Film thickness [μm] | Cap. [μF] | ESR [mΩ] | LC [μA] |
|---|---|---|---|---|---|---|
| Conventional Sample 1 | Etched foil | (No film) | (No film) | 175.4 | 12.32 | 27.5 |
| Conventional Sample 2 | Plain aluminum foil | Ti | 0.5 | 258.3 | 8.23 | 26.5 |
| Conventional Sample 3 | Plain aluminum foil | Ti | 0.02 | 257.1 | 10.09 | 24.8 |
| Conventional Sample 4 | Plain aluminum foil | TiN | 0.5 | 267.1 | 5.27 | 25.5 |
| Conventional Sample 5 | Plain aluminum foil | TiN | 0.02 | 264.3 | 6.81 | 23.8 |
| Conventional Sample 6 | Plain aluminum foil | TiC | 0.5 | 265.2 | 5.24 | 25.5 |
| Conventional Sample 7 | Plain aluminum foil | TiC | 0.02 | 264.8 | 5.72 | 23.6 |
| Conventional Sample 8 | Plain aluminum foil | Carbon | 0.5 | 264.3 | 5.81 | 26.8 |
| Conventional Sample 9 | Plain aluminum foil | Carbon | 0.02 | 263.1 | 6.12 | 25.2 |
| Conventional Sample 10 | Plain aluminum foil | Carbon on aluminum carbide | 0.5~1 | 275.4 | 4.77 | 24.5 |
| Conventional Sample 11 | Etched foil | Ti and Carbon | 0.5 | 264.1 | 6.43 | 27.9 |
| Conventional Sample 12 | Etched foil | Ti and Carbon | 0.02 | 258.1 | 7.10 | 28.1 |
| Conventional Sample 13 | Plain aluminum foil | Ti and Carbon | 0.5 | 268.3 | 5.41 | 26.5 |
| Conventional Sample 14 | Plain aluminum foil | Ti and Carbon | 0.02 | 265.2 | 6.08 | 23.6 |
| Conventional Sample 15 | Plain aluminum foil | Al and Carbon | 0.5 | 264.2 | 5.73 | 27.8 |
| Conventional Sample 16 | Plain aluminum foil | Al and Carbon | 0.02 | 263.3 | 6.02 | 25.6 |
| Inventive Sample 1 | Etched foil | Ti, Mixed layer a, and Carbon | 0.5 | 279.1 | 4.76 | 23.1 |
| Inventive Sample 2 | Etched foil | Ti, Mixed layer a, and Carbon | 0.02 | 277.3 | 4.82 | 22.5 |
| Inventive Sample 3 | Plain aluminum foil | Ti, Mixed layer a, and Carbon | 0.5 | 281.5 | 4.56 | 22.1 |
| Inventive Sample 4 | Plain aluminum foil | Ti, Mixed layer a, and Carbon | 0.02 | 279.2 | 4.39 | 21.4 |
| Inventive Sample 5 | Plain aluminum foil | Al, Mixed layer a, and Carbon | 0.5 | 281.1 | 4.51 | 22.2 |
| Inventive Sample 6 | Plain aluminum foil | Al, Mixed layer a, and Carbon | 0.02 | 282.1 | 4.37 | 20.8 |
| Inventive Sample 7 | Etched foil | Ti, Mixed layer b, and Carbon | 0.5 | 282.1 | 4.61 | 22.8 |
| Inventive Sample 8 | Etched foil | Ti, Mixed layer b, and Carbon | 0.02 | 280.1 | 4.73 | 21.3 |
| Inventive Sample 9 | Plain aluminum foil | Ti, Mixed layer b, and Carbon | 0.5 | 283.1 | 4.32 | 21.5 |
| Inventive Sample 10 | Plain aluminum foil | Ti, Mixed layer b, and Carbon | 0.02 | 281.2 | 4.11 | 20.0 |
| Inventive Sample 11 | Plain aluminum foil | Al, Mixed layer b, and Carbon | 0.5 | 284.1 | 4.31 | 21.9 |
| Inventive Sample 12 | Plain aluminum foil | Al, Mixed layer b, and Carbon | 0.02 | 285.2 | 4.10 | 19.9 |

In Table 1, "cap.", "ESR" and "LC" mean capacitor capacitance (unit: μF), equivalent series resistance (unit: mΩ) and leakage current (unit: μA), respectively. The capacitance was measured at a frequency of 120 Hz. The equivalent series resistance was measured at a frequency of 100 kHz. A value of leakage current was measured when 3 minutes have elapsed after applying a DC voltage rated at 4 V to each solid electrolytic capacitor. Respective measurement results on the capacitance, ESR and leakage current presented in Table 1 are illustrated in graph form in FIGS. 3 to 5.

Figure 3:
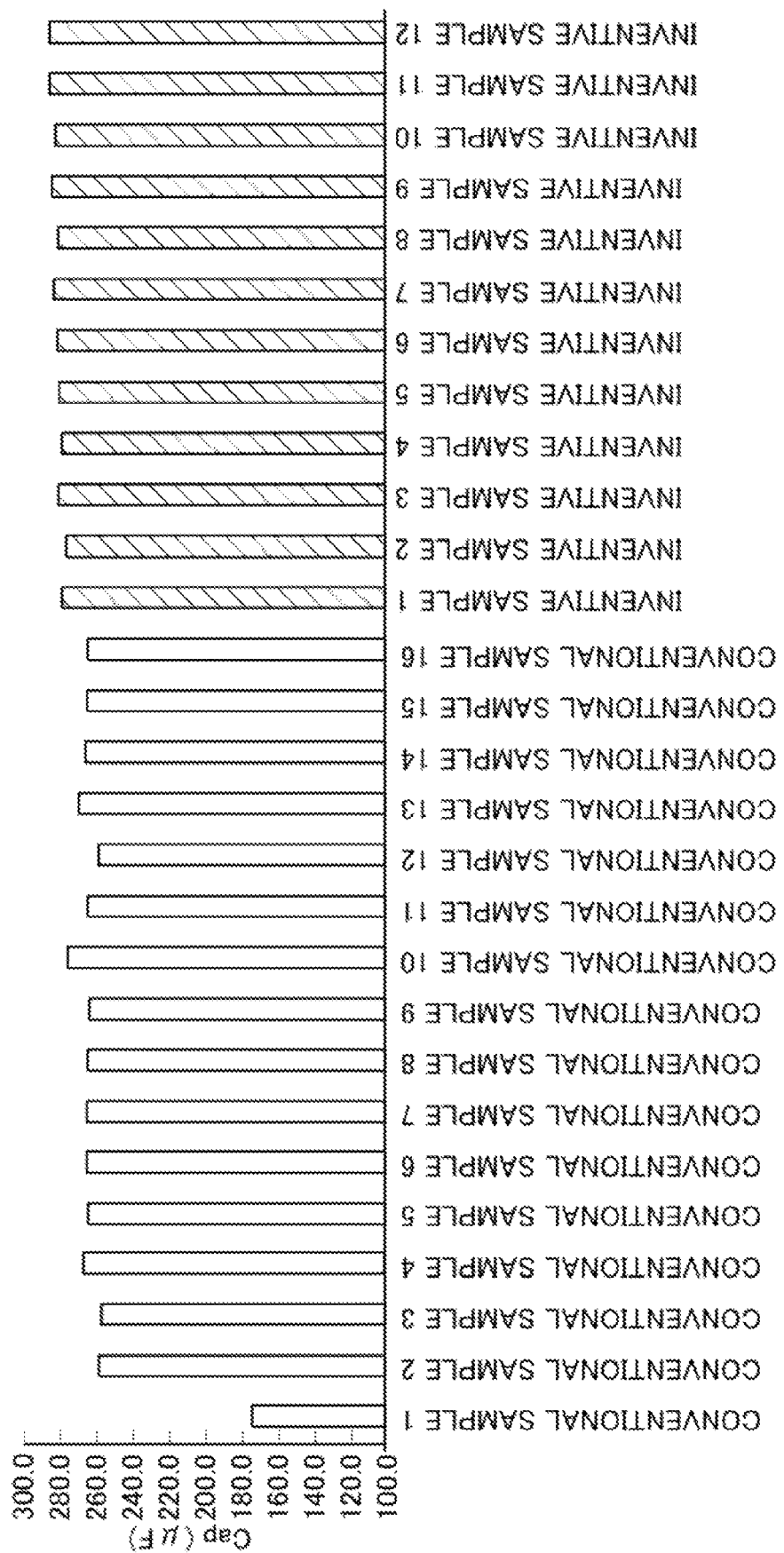
FIG. 3 is a graph for comparing capacitances measured in respective samples of a solid electrolytic capacitor using a cathode foil according to one or more implementations of the present disclosure and a solid electrolytic capacitor using a conventional cathode foil.

As shown in Table 1 and the graph in FIG. 3, a measured capacitance value in each of the inventive samples 1 to 12 is greater than measured capacitance values in the conventional samples 1 to 16. As compared to the measured value (175.4 μF) in the conventional sample 1 using as a cathode foil an etched foil on which a film such as a metal film is not formed, it is found that the capacitance in each of the inventive samples 1 to 12 is increased by about 60%. Further, the capacitors in each of the conventional samples 11 and 12 and each of the inventive samples 1, 2, 7 and 8 are different from each other only in terms of whether the mixed layer is formed between the Ti layer and the carbon layer in the cathode foil (the capacitors in each of the inventive samples 1 and 2 and each of the inventive samples 7 and 8 are different from each other only in terms of whether a gradient is given to a content rate of each component in the mixed layer of the cathode foil). However, it is found that the measured values (279.1 µF, 277.3 µF) in the inventive samples 1 and 2 and the measured values (282.1 µF, 280.1 µF) in the inventive samples 7 and 8 are greater than the measured values (264.1 µF, 258.1 µF) in the conventional samples 11 and 12. It is also found that as compared to the measured values in the conventional samples 13 to 16, the measured values in the inventive samples 3 to 6 and 9 to 12 each newly provided with the mixed layer become greater. Particularly, it is found that the measured values in the inventive samples 7 to 12 where a gradient is given to a content rate of each component in the mixed layer in the aforementioned manner are greater than the measured values in the inventive samples 1 to 6 where no gradient is given to a content rate of each component in the mixed layer.

Figure 4:
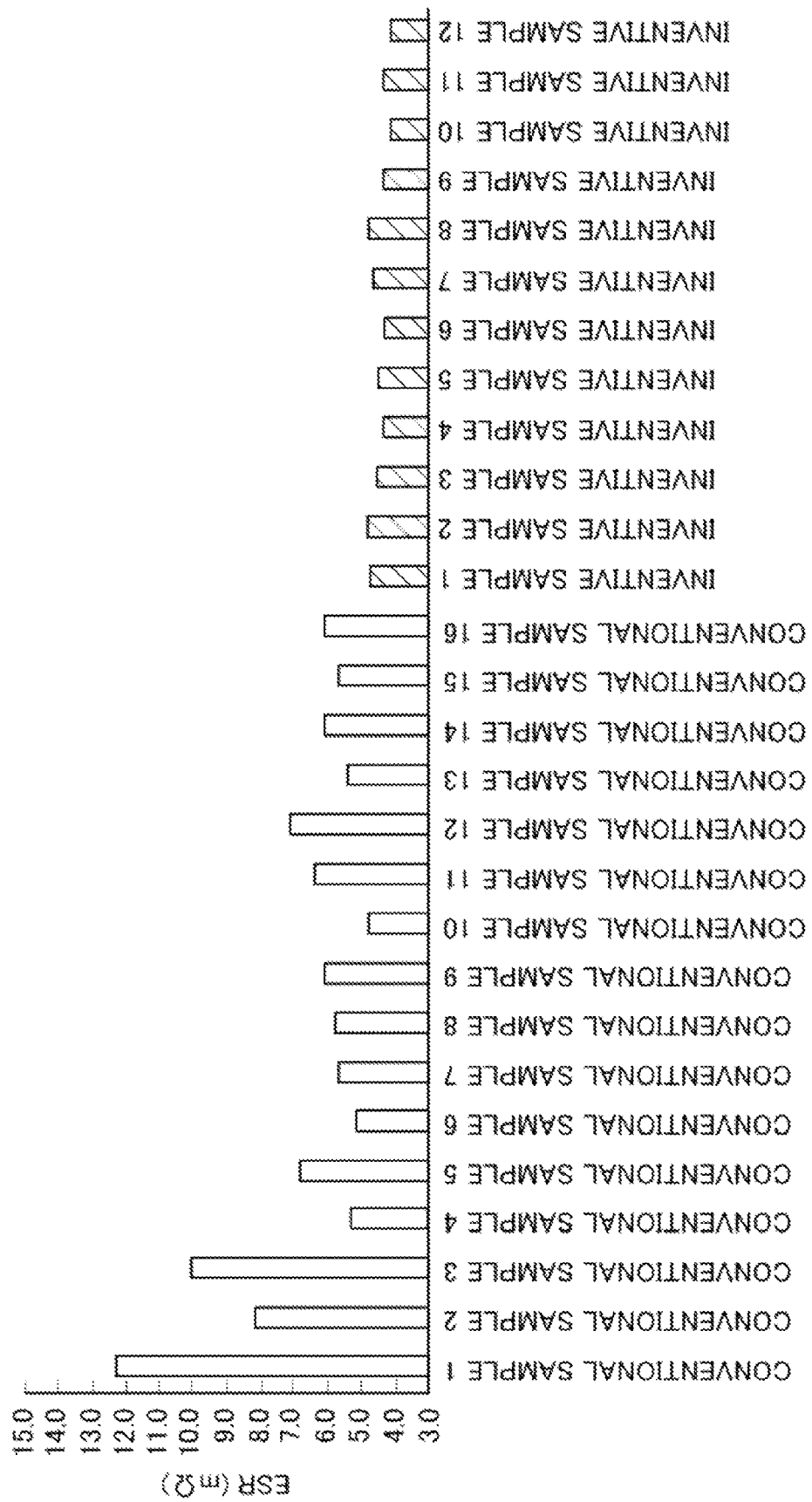
FIG. 4 is a graph for comparing ERSs measured in respective samples of a solid electrolytic capacitor using a cathode foil according to one or more implementations of the present disclosure and a solid electrolytic capacitor using a conventional cathode foil.

As shown in Table 1 and the graph in FIG. 4, a measured ESR value in each of the inventive samples 1 to 12 is less than measured ERS values in the conventional samples 1 to 16. As compared to the measured value (12.32 mΩ) in the conventional sample 1 using as a cathode foil an etched foil on which a film such as a metal film is not formed, it is found that the ESR in each of the inventive samples 1 to 12 is reduced by about 60 to 65%. Further, the capacitors in each of the conventional samples 11 and 12 and each of the inventive samples 1, 2, 7 and 8 are different from each other only in terms of whether the mixed layer is formed between the Ti layer and the carbon layer in the cathode foil, as previously mentioned. However, it is found that the measured values (4.76 mΩ, 4.82 mΩ) in the inventive samples 1 and 2 and the measured values (4.61 mΩ, 4.73 mΩ) in the inventive samples 7 and 8 are less than the measured values (6.43 mΩ, 7.10 mΩ) in the conventional samples 11 and 12. It is also found that as compared to the measured values in the conventional samples 13 to 16, the measured values in the inventive samples 3 to 6 and 9 to 12 each newly provided with the mixed layer become smaller. Particularly, it is found that the measured values in the inventive samples 7 to 12 where a gradient is given to a content rate of each component in the mixed layer in the aforementioned manner are less than the measured values in the inventive samples 1 to 6 where no gradient is given to a content rate of each component in the mixed layer.

Further, the conventional samples 11 and 12 (13 and 14; 15 and 16) are an example of two capacitors which have the same film configuration in each cathode foil and respective different film thicknesses of 0.5 µm and 0.02 µm. As shown in Table 1 and the graph in FIG. 4, it is found that the ESR is increased when the film thickness is reduced in either example (the increment is in the range of 0.3 mΩ to 0.7 mΩ). In contrast, comparing the measured ESR values in the inventive samples 1 and 2 (3 and 4; 5 and 6) which are two inventive samples different only in film thicknesses, although the measured value (4.76 mΩ) in the inventive sample 1 and the measured value (4.82 mΩ) in the inventive sample 2 are almost the same (it is assumed that such measurement results have a relationship with the surface-roughening of the aluminum foil in the inventive samples 1 and 2), the measured value (4.39 mΩ) in the inventive sample 4 is less than the measured value (4.56 mΩ) in the inventive sample 3, and the measured value (4.37 mΩ) in the inventive sample 6 is less than the measured value (4.51 mΩ) in the inventive sample 5. This tendency is also observed in the inventive samples 7 to 14 where a gradient is given to a content rate of each component in the mixed layer. Therefore, it is understood that according to one or more implementations, the cathode foil of the present disclosure is superior to the conventional cathode foils in that, even if a film is formed to have a relatively small thickness, the ESR property can be adequately maintained, at least in one or more implementations where an aluminum foil is used without being subjected to surface-roughening.

Figure 5:
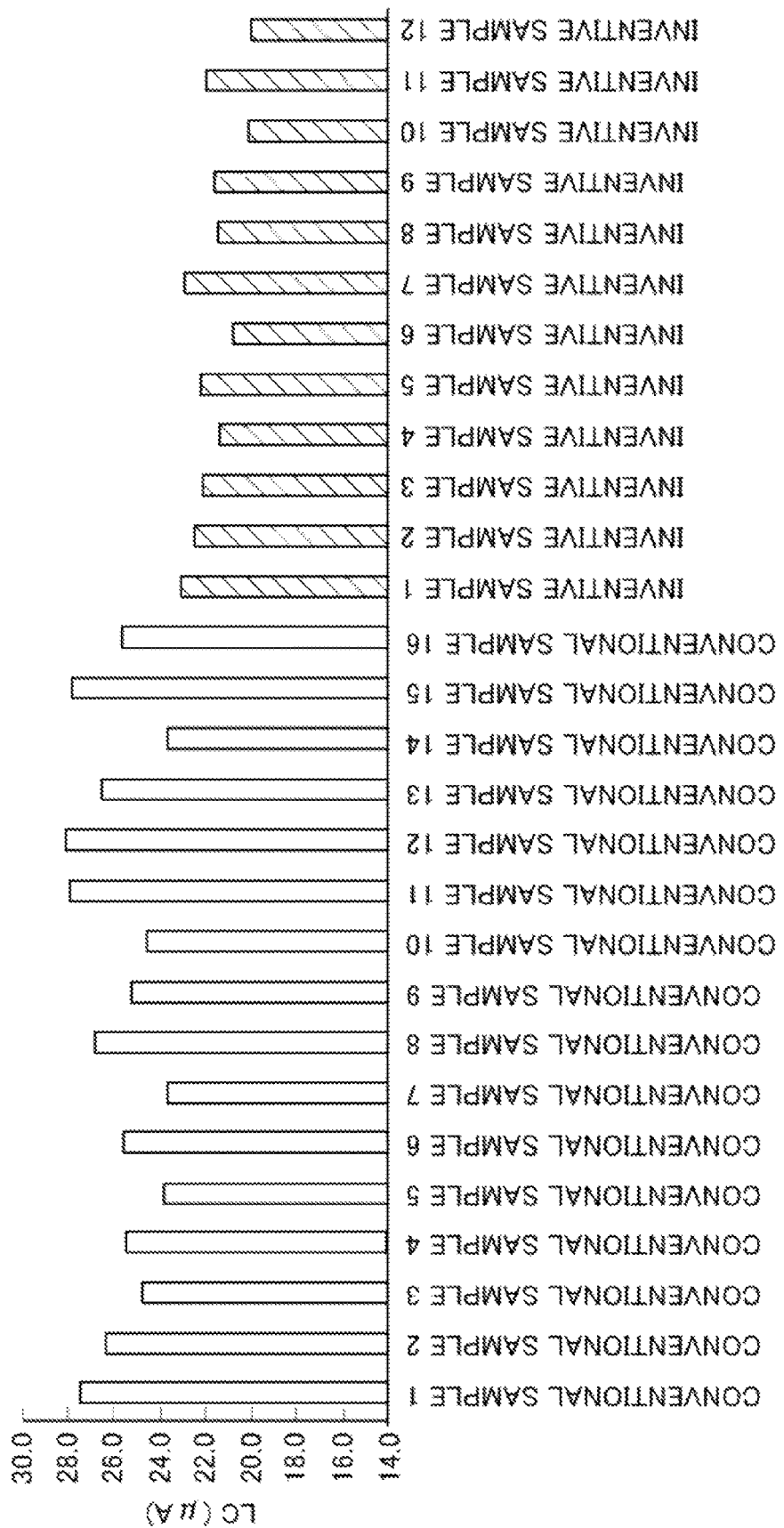
FIG. 5 is a graph for comparing leakage currents measured in respective samples of a solid electrolytic capacitor using a cathode foil according to one or more implementations of the present disclosure and a solid electrolytic capacitor using a conventional cathode foil.

As shown in Table 1 and the graph in FIG. 5, a measured leakage current value in each of the inventive samples 1 to 12 is less than measured leakage current values in the conventional samples 1 to 16. Further, the measured values in the inventive samples 7 to 12 each formed with the mixed layer b are less than the measured values in the inventive samples 1 to 6 each formed with the mixed layer a. As compared to the measured values in the conventional samples 11 to 16 with the measured values in the inventive samples 1 to 6, it is found that the leakage current is reduced by about 20%, based on providing the mixed layer. Further, as compared to the measured values in the inventive samples 7 to 12 each provided with the mixed layer b with the measured values in the inventive samples 1 to 6 each provided with the mixed layer a, it is found that the leakage current is reduced by about several %.

Heat Resistance Test of Solid Electrolytic Capacitor

Next, the capacitors of the conventional samples and the capacitors of the inventive samples were subjected to a heat resistance test. The heat resistance test was performed by applying a rated voltage of 4 V to each capacitor of the conventional samples 1 to 16 and the inventive samples 1 to 12, at a temperature of 125° C. for 1000 hours, and measured capacitance and ESR values before and after the test were compared.

Respective values of capacitance and ESR measured after the test in each capacitor, and a change rate of the measured values before and after the test, are presented in the following Table 2.

TABLE 2

|  | Cap. after test [µF] | Change Rate Δ C/C [%] | ESR after test [mΩ] | Change Rate Δ ESR/ESR [%] |
|---|---|---|---|---|
| Conventional Sample 1 | 164.5 | −6.2 | 15.52 | 26.0 |
| Conventional Sample 2 | 245.3 | −5.0 | 10.04 | 22.0 |
| Conventional Sample 3 | 242.1 | −5.8 | 12.78 | 26.7 |
| Conventional Sample 4 | 256.2 | −4.1 | 6.47 | 22.8 |
| Conventional Sample 5 | 252.1 | −4.6 | 8.51 | 25.0 |
| Conventional Sample 6 | 257.3 | −3.0 | 6.14 | 17.2 |
| Conventional Sample 7 | 256.5 | −3.2 | 7.13 | 24.7 |
| Conventional Sample 8 | 253.1 | −4.2 | 6.31 | 8.6 |
| Conventional Sample 9 | 252.3 | −4.1 | 7.22 | 18.0 |
| Conventional Sample 10 | 272.1 | −1.2 | 4.87 | 2.1 |
| Conventional Sample 11 | 254.1 | −3.8 | 7.64 | 18.8 |
| Conventional Sample 12 | 246.5 | −4.5 | 8.90 | 25.4 |
| Conventional Sample 13 | 263.2 | −1.9 | 6.12 | 13.1 |
| Conventional Sample 14 | 258.2 | −2.6 | 7.28 | 19.7 |
| Conventional Sample 15 | 252.9 | −4.3 | 6.23 | 8.7 |
| Conventional Sample 16 | 251.8 | −4.4 | 7.12 | 18.3 |

TABLE 2-continued

|  | Cap. after test [μF] | Change Rate Δ C/C [%] | ESR after test [mΩ] | Change Rate Δ ESR/ESR [%] |
|---|---|---|---|---|
| Inventive Sample 1 | 274.5 | −1.6 | 4.88 | 2.5 |
| Inventive Sample 2 | 271.8 | −2.0 | 4.93 | 2.3 |
| Inventive Sample 3 | 279.1 | −0.9 | 4.61 | 1.1 |
| Inventive Sample 4 | 277.9 | −0.5 | 4.41 | 0.5 |
| Inventive Sample 5 | 279.1 | −0.7 | 4.55 | 0.9 |
| Inventive Sample 6 | 280.3 | −0.6 | 4.39 | 0.5 |
| Inventive Sample 7 | 279.5 | −0.9 | 4.71 | 2.2 |
| Inventive Sample 8 | 276.5 | −1.3 | 4.83 | 2.1 |
| Inventive Sample 9 | 281.2 | −0.7 | 4.34 | 0.5 |
| Inventive Sample 10 | 280.3 | −0.3 | 4.12 | 0.2 |
| Inventive Sample 11 | 282.8 | −0.5 | 4.33 | 0.5 |
| Inventive Sample 12 | 284.3 | −0.3 | 4.11 | 0.2 |

In Table 2, "Δ C/C" means a change rate of measured capacitance values before and after the test, and a value: [(measured value after test)−(measured value before test)]/ (measured value before test), expressed in percentage. Similarly, "Δ ESR/ESR" means a value of a change rate of measured ESR values before and after the test, expressed in percentage. In calculation for each change rate, the value presented in Table 1 was used as the measured value before the test. Respective change rates of capacitance and ESR presented in Table 2 are illustrated in graph form in FIGS. 6 and 7.

Firstly, in regard to a capacitance after the heat resistance test, as shown in Table 2, a measured capacitance value in each of the inventive samples 1 to 12 is greater than measured capacitance values in the conventional samples 1 to 16. Particularly, the measured capacitance values in the inventive samples 7 to 12 are greater than the measured capacitance values in the inventive samples 1 to 6. According to one or more implementations, it is found that the capacitor of the present disclosure has a larger capacitance than that of the conventional capacitor even after the heat resistance test. Further, in regard to the change rate of measured capacitance values before and after the test, as is evident from Table 2 and FIG. 6, the conventional samples 1 to 16 are largely different from the inventive samples 1 to 12 in terms of the change rate. That is, in the capacitors of the conventional samples 11 and 12, through the heat resistance test, the measured capacitance values are reduced by 3.8% and 4.5%, respectively. In contrast, in the capacitors of the inventive samples 1 and 2 each provided with the mixed layer, the reduction rates of the measured capacitance values due to the heat resistance test are 1.6% and 2.0%, respectively. Further, in the capacitors of the inventive samples 7 and 8, the reduction rates are only 0.9% and 1.3%, respectively. Similarly, according to one or more implementations, as compared to the reduction rates of the measured capacitance values in the conventional samples 13 to 16, the reduction rates in the inventive samples 3 to 6 and 9 to 12 each newly provided with the mixed layer are smaller, and particularly, the reduction rates in the inventive samples 9 to 12 are smaller than those of the inventive samples 3 to 6, which shows that the cathode foil of the present disclosure is superior to the conventional cathode foils in heat resisting property concerning a capacitance property.

The capacitance reduction rates in the inventive samples 7 and 8 are, respectively, 0.9% and 1.3%, whereas the capacitance reduction rates in the inventive samples 9 and 10 where the cathode foil is prepared using a plain aluminum foil are, respectively, 0.7% and 0.3%. That is, it can be said that, in view of heat resistance, it is desirable to avoid subjecting an aluminum foil to an etching treatment.

Figure 6:
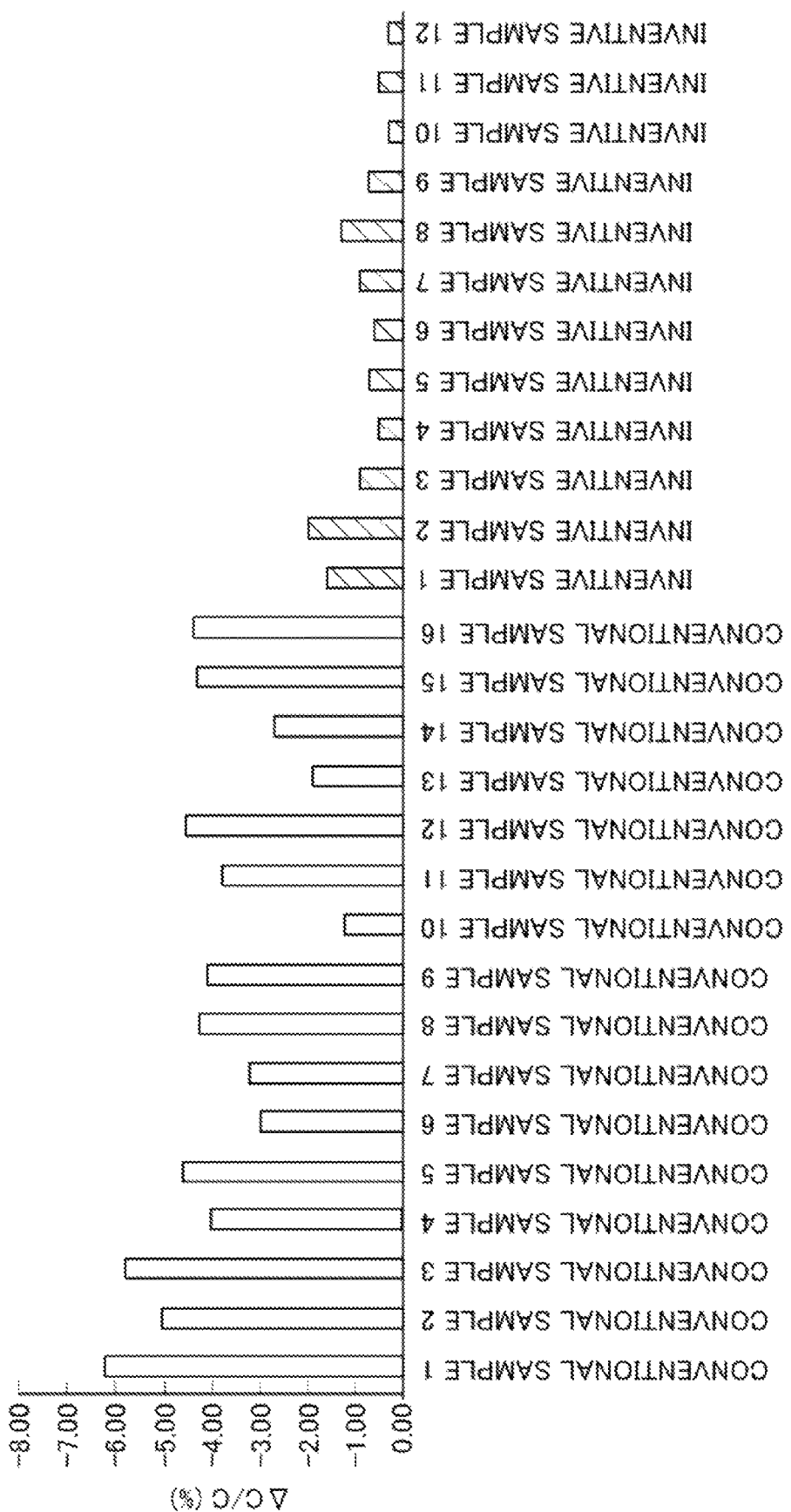
FIG. 6 is a graph for comparing change rates of capacitances before and after test measured by subjecting, to a heat resistance test, respective samples of a solid electrolytic capacitor using a cathode foil according to one or more implementations of the present disclosure and a solid electrolytic capacitor using a conventional cathode foil.
Figure 7:
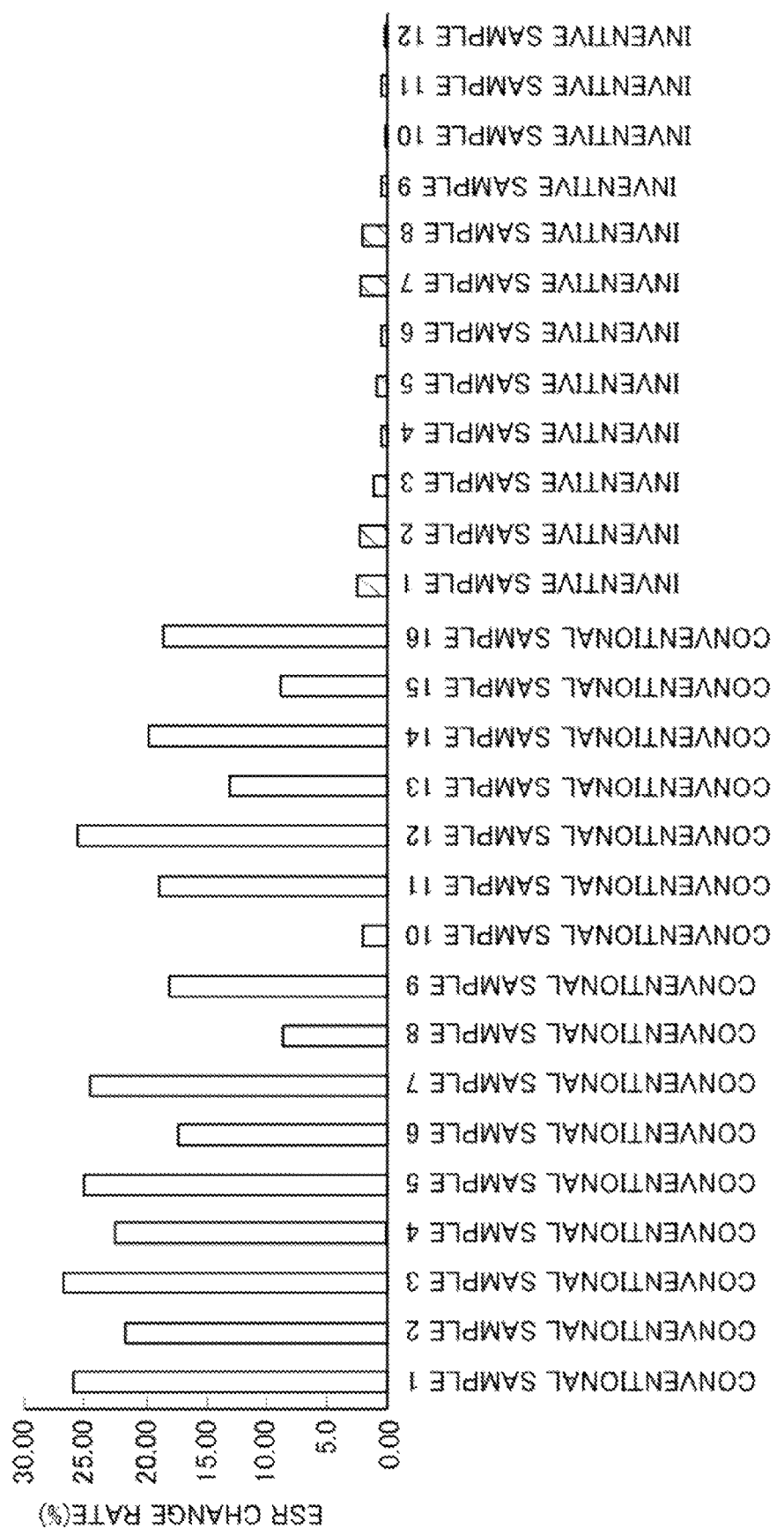
FIG. 7 is a graph for comparing change rates of ESRs before and after test measured by subjecting, to a heat resistance test, respective samples of a solid electrolytic capacitor using a cathode foil according to one or more implementations of the present disclosure and a solid electrolytic capacitor using a conventional cathode foil.

Further, as is evident from the graphs for the inventive samples 3 to 6 and 9 to 10 in FIG. 6, in these inventive samples, the reduction rate of the measured capacitance values is suppressed at a lower level when the film thickness is set to 0.02 μm than when the film thickness is set to 0.5 μm. That is, according to one or more implementations, it can be said that, when the cathode foil of the present disclosure is prepared without subjecting an aluminum foil to an etching treatment, it is preferable to form the film so that the film has a small thickness, in view of heat resistance.

Next, in regard to an ESR after the heat resistance test, as shown in Table 2, a measured ESR value in each of the inventive samples 1 to 12 is less than measured ESR values in the conventional samples 1 to 16. Particularly, the measured ESR values in the inventive samples 7 to 12 are less than the measured capacitance values in the inventive samples 1 to 6. According to one or more implementations, it is found that the capacitor of the present disclosure has a smaller ESR than that of the conventional capacitor even after the heat resistance test. Further, in regard to the change rate of measured ESR values before and after the test, as is evident from Table 2 and FIG. 7, the conventional samples 1 to 16 are largely different from the inventive samples 1 to 12 in terms of the change rate. That is, in the capacitors of the conventional samples 11 and 12, through the heat resistance test, increase rates of the measured ESR values are 18.8% and 25.4%, respectively. In contrast, in the capacitors of the inventive samples 1 and 2 each provided with the mixed layer a, the increase rates of the measured ESR values due to the heat resistance test are 2.5% and 2.3%, respectively. Further, in the capacitors of the inventive samples 7 and 8 each provided with the mixed layer b, the increase rates of the measured ESR values due to the heat resistance test are only 2.2% and 2.1%, respectively. Similarly, as compared to the increase rates of the measured ESR values in the conventional samples 13 to 16, the increase rates in the inventive samples 3 to 6 and 9 to 12 each newly provided with the mixed layer become smaller. Further, according to one or more implementations, as compared to the increase rates of the measured ESR values in the inventive samples 1 to 6, the increase rates in the inventive samples 7 to 12 become smaller, which shows that the cathode foil of the present disclosure is superior to the conventional cathode foils in terms of an ESR property.

In this regard, the ESR increase rates in the inventive samples 7 and 8 are, respectively, 2.2% and 2.1%, whereas the ESR increase rates in the inventive samples 9 and 10 where the cathode foil is prepared using a plain aluminum foil are, respectively, 0.5% and 0.2%. That is, it can be said that, in view of heat resistance, it is desirable to avoid subjecting an aluminum foil to an etching treatment.

[One or More Implementations]

As one or more implementations of the present disclosure, a current collector in which a first electrically conductive layer consisting of Ti or Al, a mixed layer containing graphite-like carbon (hereinafter occasionally noted as "GLC") and Ti or Al in a mixed state, and a second electrically conductive layer consisting of GLC, are formed on an aluminum foil having a roughened surface, and a lithium ion secondary battery prepared using the current collector, will now be described. However, as previously mentioned, according to one or more implementations, each of the aluminum foil used as a substrate of the current collector and the Ti or Al for forming the first electrically conductive layer can be substituted by other material, and the current collector of the present disclosure has excellent properties even when a surface of the substrate is not roughened, as described later using performance test data. However, as previously mentioned, according to one or more implementations, application of the current collector of the present disclosure is not limited to a lithium ion secondary battery, but the current collector may be used for an electrode of any electric energy storage element, such as any other type of secondary battery, an electric double layer capacitor or a hybrid capacitor.

Current Collector

Figure 8:
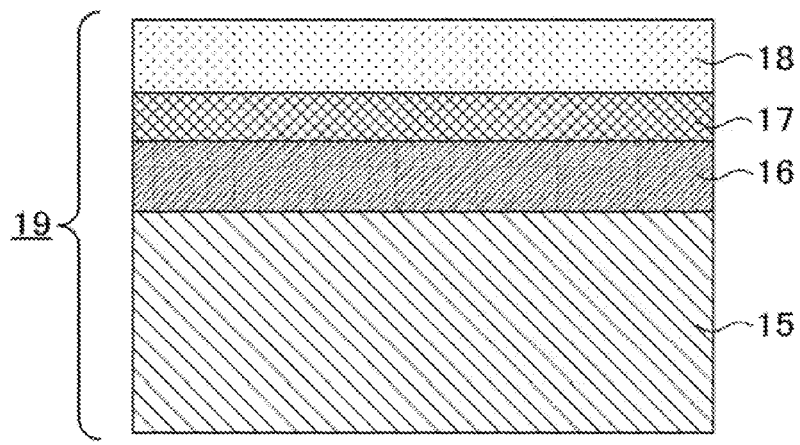
FIG. 8 is a sectional view illustrating a layered structure of a current collector according to one or more implementations of the present disclosure.

FIG. 8 is a sectional view illustrating a layered structure of a current collector 19 according to one or more implementations. The collect collector 19 comprises: a metal foil 15 as an aluminum foil subjected to surface-roughening by performing an electrochemical etching treatment in an acid solution; a metal layer 16 formed on the metal foil 15 and composed of a metal film consisting of Ti or Al; a mixed layer 17 formed on the metal layer 16 and containing GLC and the Ti or Al in a mixed state; and a carbon layer 18 formed on the mixed layer 17 and consisting of GLC.

As the aluminum foil, it is possible to use a commercially available high-purity aluminum foil. A thickness of the aluminum foil is not particularly limited. However, in view of processability, electrical conductivity, weight, volume, cost and others, the aluminum foil preferably has a thickness of 5 μm to 50 μm.

The metal layer 16 is formed by: placing the metal foil 15 and a metal material of Ti or Al as a vaporization source, within a vacuum chamber; vaporizing and ionizing Ti or Al, for example, by using electron beam and plasma generation electrodes; and introducing generated positive metal ions to the metal foil 15. An example of a film forming method includes a physical vapor deposition (PVD) method, such as an ion plating method. In cases where a layer consisting of nitride or carbide of a metal such as Ti or Al is formed on the metal foil 15, the first electrically conductive layer may be formed by performing the above process, for example, in a nitrogen gas or methane gas atmosphere.

Other than the ion plating method, a physical vapor deposition method for forming the metal layer 16 includes a vacuum vapor deposition method, a sputtering method, and the like. It is also possible to use a chemical vapor deposition (CVD) method such as a thermal CVD, optical CVD, plasma CVD or organic vapor-phase epitaxial method.

The mixed layer 17 can be formed, for example, by an ion plating method, as with the metal layer 16. That is, in addition to the metal material of Ti or Al, a carbon material may be provided as a vaporization source to perform a film formation process simultaneously using the two vaporization sources. The introduction of the mixed layer 17 makes it possible to enhance adhesion between the metal and the GLC to thereby prevent transformation due to a chemical reaction of the metal.

Preferably, the mixed layer 17 is configured such that, in a boundary region with the metal layer 16, it contains substantially only Ti or Al, whereas, in a boundary region with the carbon layer 18, it contains substantially only carbon (GLC), wherein it is particularly configured such that a content rate of GLC continuously increases in a direction from the metal layer 16 to the carbon layer 18. As one example, the mixed layer 17 can be formed by: (i) during an initial stage of film formation for the mixed layer 17, irradiating only a metal material with an electron beam to form a film consisting only of Ti or Al; (ii) along with an elapse of time, gradually reducing an irradiation amount of electron beam for the metal material, while increasing an irradiation amount of electron beam for a graphite material, to form a mixed film containing the metal and GLC in a mixed state, wherein a content rate of GLC gradually increases in a direction toward a top of the deposit; and (iii) during a final stage of the film formation, setting the irradiation amount of electron beam for the metal material to zero to form a film consisting only of GLC. On the other hand, when the mixed layer 17 is formed by a sputtering method, the mixed layer 17 having the preferred configuration can be formed by any suitable process, for example, by, along with an elapse of time, gradually reducing a voltage applied to a metal target (gradually reducing a sputtering rate of the metal target), while gradually increasing a voltage applied to a graphite target (gradually increasing a sputtering rate of the graphite target).

Incidentally, among the aftermentioned performance test data, data of inventive samples 1 to 4 is measured using a current collector 19 obtained by forming a mixed layer 17 using the above ion plating method, particularly, in such a manner as to allow a content rate of GLC to continuously increase in a direction from the metal layer 16 to the carbon layer 18. However, it is assumed that, even if the mixed layer 17 partially has a region where the GLC content rate gradually decreases in the direction toward the carbon layer 18 (this situation can occur due to limits of film forming techniques), it is possible to obtain excellent properties as compared to a conventional collect collector. This is because, even in such a region, the presence of GLC and Ti or Al in a mixed state provides enhanced adhesion between the two components, and therefore prevents transformation due to a chemical reaction such as oxidation of the Ti or Al layer, so that a contact resistance between the current collector and an electrode layer can be suppressed at a lower level over a long period of time.

The carbon layer 18 can be formed, for example, by an ion plating method, as with the metal layer 16 and the mixed layer 17. Typically, the carbon layer 18 can be formed by, after reducing the irradiation amount of electron beam for the metal material to zero in the process of forming the mixed layer 17, continuing the film formation for a given time by successively irradiating only the graphite material with an electron beam.

According to one or more implementations, the carbon layer 18 of the present disclosure is preferably formed using a vapor deposition method such as an ion plating method, as with the metal layer 16 and the mixed layer 17, instead of a method of dispersing carbon particles in a binder such as a resin binder, and then applying the obtained mixture. This is because, in a layer of carbon particles formed by kneading them together with a binder, a content rate of carbon is reduced substantially by an amount corresponding to the binder, and the carbon particles come into point contact with a lower Ti or Al layer. Moreover, in the applying method, it is difficult to increase electrical conductivity in the interface, causing an increase in interfacial resistance and deterioration in adhesion therebetween, and it is also difficult to form a film thinly and evenly. It is desirable to form the carbon layer 18 as a smooth and dense GLC film.

It is sufficient if each of the metal layer 16, the mixed layer 17 and the carbon layer 18 has a thickness of about 0.1 nm to 15 nm. Further, at least when a total thickness of the three layers is 0.3 nm or more, good properties as a current collector can be obtained. As long as electrical conductivity and economic performance are not impaired, the thickness of each of the layers may further be increased. However, when the metal foil is surface-roughened, it is preferable that the total thickness of the three layers is set to fall within 45 nm, in view of even coatability onto a porous inner wall.

Preferably, each of the metal layer 16, the mixed layer 17 and the carbon layer 18 is formed by the same film forming method. This is because a production process can be simplified so as to enhance productivity and significantly reduce a production cost. However, as long as economic performance is not impaired, each of the layers may be formed by a different method.

Secondary Battery

Figure 9:
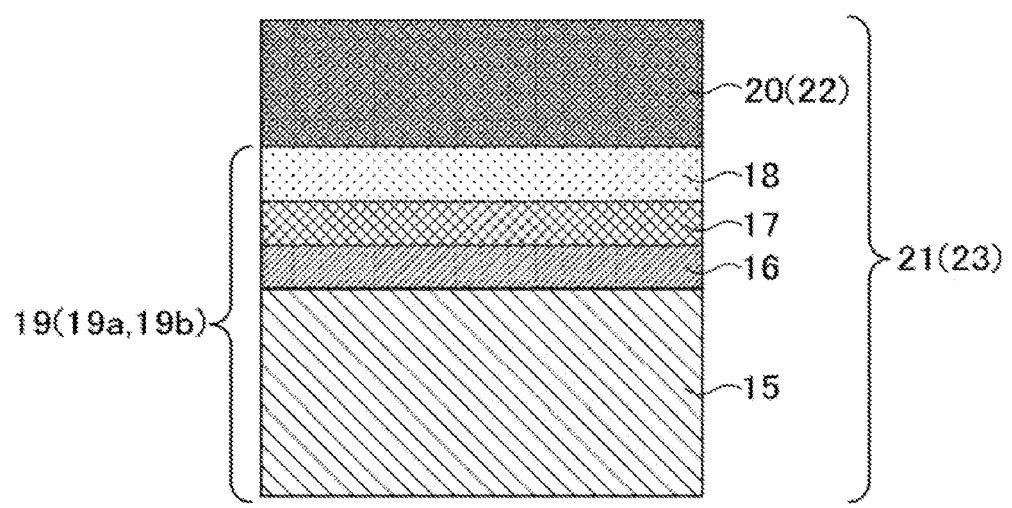
FIG. 9 is a sectional view illustrating a layered structure of a positive or negative electrode according to one or more implementations of the present disclosure.
Figure 10A:
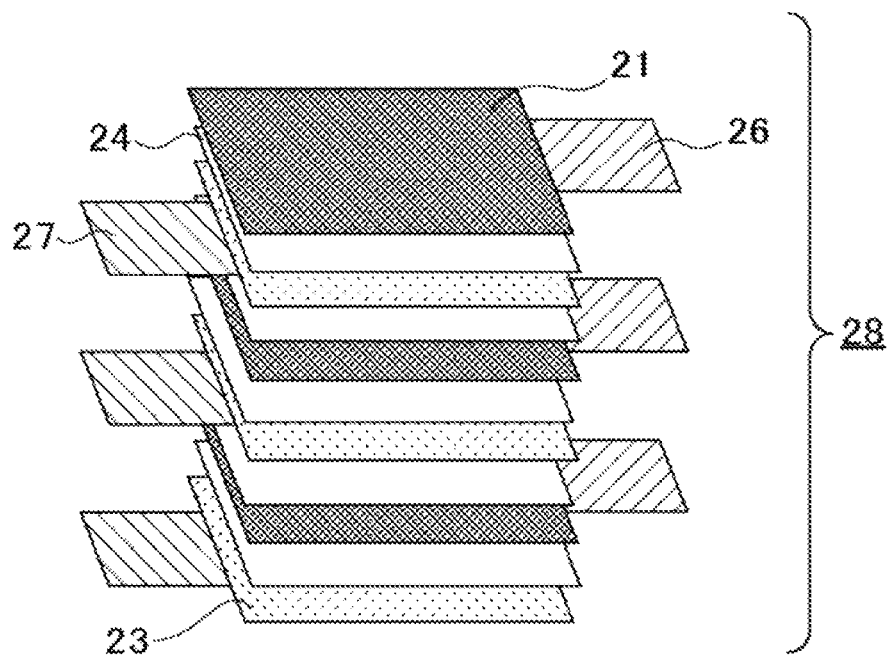
FIG. 10a is an exploded diagram illustrating a structure of a lithium ion secondary battery according to one or more implementations of the present disclosure.
Figure 10B:
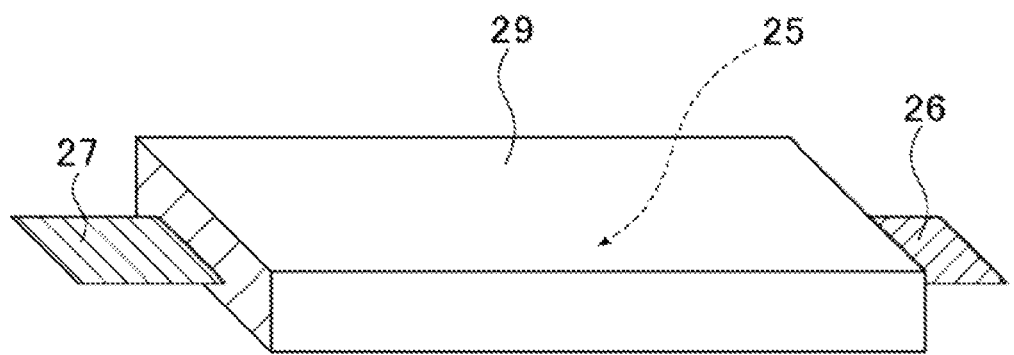
FIG. 10b is a diagram illustrating an external structure of a lithium ion secondary battery according to one or more implementations of the present disclosure.

FIG. 9 is a sectional view of a positive electrode 21 (or a negative electrode 23) prepared using the current collector 19 (the current collector used in a positive electrode and the current collector used in a negative electrode will hereinafter be referred to respectively as "positive-side current corrector 19a" and "negative-side current corrector 19b"). FIGS. 10a and 10b are, respectively, an exploded diagram and an appearance diagram of a lithium ion secondary battery 30 as one example of a secondary battery prepared using the electrodes 21, 23. The lithium ion secondary battery 30 is prepared by the following method: (i) providing a positive electrode 21 in which an electrode layer 20 obtained by kneading lithium iron phosphate (LiFePO$_4$) as an active substance, acetylene black as an electrically conductive assistance, styrene-butadiene rubber as a binder and ammonium salt of carboxymethyl cellulose as a thickener together with water, is formed on the current collector 19a, and an negative electrode 23 in which an electrode layer 22 obtained by kneading graphite as an active substance, acetylene black as an electrically conductive assistance, styrene-butadiene rubber as a binder and ammonium salt of carboxymethyl cellulose as a thickener together with water, is formed on the current collector 19b; and laminating the positive electrode 21 to the negative electrode 23 through a separator, whereafter a positive tab terminal 26 and a negative tab terminal 27 are connected, respectively, to the positive-side current collector 19a and the negative-side current collector 19b, and a plurality of the laminates are stacked to prepare a battery element 28; and (ii) after inserting the battery element 28 in a casing 29, injecting, into the casing, an electrolytic solution obtained by dissolving lithium hexafluorophosphate (LiPF$_6$) as an electrolyte 25 in a mixed solution of ethylene carbonate and diethyl carbonate as organic solvents, and then sealing the casing. It should be understood that respective materials of the active substance, the electrically conductive assistant, the binder and the electrolytic solution, a combination thereof, and a structure of the element (coin-type, wound-type or stacked-type) are not limited to the above example.

Performance Test of Current Collector

According to one or more implementations, a performance test of the current collector of the present disclosure was performed for a current collector prepared using as a substrate an aluminum foil subjected to surface-roughening by performing an electrochemical etching treatment in an acid solution, as mentioned above, and a current collector prepared using as a substrate an aluminum foil which is not subjected to surface-roughening. In each of the current collectors, a Ti or Al layer was used as the metal layer, and a total thickness of the metal layer, the mixed layer and the carbon layer was set to 25 nm. In order to enhance accuracy of evaluation, a coin-type battery for performance test was prepared by, as for a lithium ion secondary battery element for performance evaluation, using, as a positive electrode, an electrode having the above electrode layer formed on the current collector, and using a lithium plate as a counter electrode. By using the coin-type battery, a discharge rate property of the positive electrode and a charge-discharge cycle life property were measured and evaluated.

The discharge rate property of the positive electrode was evaluated by: performing (i) a charge operation of charging the coin-type battery up to 4.2 V at a given charge rate (charge current value) in a constant current charge mode, and then charging the coin-type battery in a constant voltage charge mode until the charge current value becomes 0.01 C, once, and then performing (ii) a discharge operation of discharging the coin-type battery to 3.0 at a particular discharge rate (discharge current value) in a constant current discharge mode, once; and calculating a capacity maintenance ratio ("discharge capacity [mAh/g] at each discharge rate (discharge current value)"/"discharge capacity [mAh/g] at a discharge rate (discharge current value) of 0.2 C"×100), from a discharge capacity ratio of the coin type battery measured at each discharge rate (discharge current value) on the basis of a discharged capacity at a discharge rate (discharge current value) of 0.2 C. The discharge rate property was evaluated by setting an environmental temperature at 25° C., and changing the discharge rate (discharge current value) in the range of 0.2 C to 10 C, and the capacity maintenance ratios at the respective discharge rates (discharge current values) were compared with each other. When the discharge rate (discharge current value) is less than 1 C, the given charge rate (charge current value) was set to the same value as the discharge rate (discharge current value). When the discharge rate (discharge current value) is equal to or greater than 1 C, the given charge rate (charge current value) was fixed to 1 C. In this regard, a discharge rate (discharge current value) 1 C represents a current value for discharging the entire capacity of a battery by taking one hour, and a discharge rate (discharge current value) 10 C represents a current value for rapidly discharging the entire capacity of a battery by taking 6 minutes.

The charge-discharge cycle life characteristic of the positive electrode was evaluated by: stetting an environmental temperature at 25° C.; fixing each of the charge rate (charge current value) and the discharge rate (discharge current value) to 1 C; repeating the above charge-discharge cycle 20 times; and calculating a capacity maintenance ratio on the basis of an initial discharge capacity (in the first cycle), every time one cycle was completed.

In order to verify an effect of surface-roughening of the metal foil with respect to adhesion strength between the current collector and the electrode layer, a test was performed using a SAICAS (Surface And Interfacial Cutting Analysis System) as an oblique cutting apparatus. A cutting blade having a diamond cutting edge with a width of 1 mm was cut into the battery from a surface of the electrode at a constant speed (horizontal component: 6 μm/s, vertical component: 0.6 μm/s). After reaching to a joint interface between the current collector and the electrode layer, a horizontal stress imposed on the cutting blade when horizontally moving the cutting blade at a constant speed (horizontal component: 6 μm/s) was measured and compared as a peeling strength.

According to one or more implementations, a configuration of a current collector for use in each of the comparative samples 1 to 7 as secondary batteries for comparison and the inventive samples 1 to 4 as secondary batteries of the present disclosure, subjected to the measurements, is as follows.

(Comparative Sample 1)

A current collector composed of a plain aluminum foil.

(Comparative Sample 2)

A current collector obtained by subjecting a plain aluminum foil to an etching treatment.

(Comparative Sample 3)

A current collector obtained by forming a graphite-like carbon film on a plain aluminum foil to have a thickness of 20 nm.

(Comparative Sample 4)

A current collector obtained by forming a Ti film on a plain aluminum foil to have a thickness of 12.5 nm, and forming a graphite-like carbon film thereon to have a thickness of 12.5 nm.

(Comparative Sample 5)

A current collector obtained by subjecting a plain aluminum foil to an etching treatment, and forming a Ti film and a graphite-like carbon film thereon in this order to have respective thicknesses of 12.5 nm and 12.5 nm.

(Comparative Sample 6)

A current collector obtained by forming an Al film on a plain aluminum foil to have a thickness of 12.5 nm, and forming a graphite-like carbon film thereon to have a thickness of 12.5 nm.

(Comparative Sample 7)

A current collector obtained by subjecting a plain aluminum foil to an etching treatment, and forming an Al film and a graphite-like carbon film thereon in this order to have respective thicknesses of 12.5 nm and 12.5 nm.

(Inventive Sample 1)

A current collector obtained by forming a Ti film, a Ti and graphite-like carbon mixed layer, and a graphite-like carbon film, on a plain aluminum foil in this order to have respective thicknesses of 10 nm, 5 nm and 10 nm.

(Inventive Sample 2)

A current collector obtained by subjecting a plain aluminum foil to an etching treatment, and forming a Ti film, a Ti and graphite-like carbon mixed layer, and a graphite-like carbon film, thereon in this order to have respective thicknesses of 10 nm, 5 nm and 10 nm.

(Inventive Sample 3)

A current collector obtained by forming an Al film, an Al and graphite-like carbon mixed layer, and a graphite-like carbon film, on a plain aluminum foil in this order to have respective thicknesses of 10 nm, 5 nm and 10 nm.

(Inventive Sample 4)

A current collector obtained by subjecting a plain aluminum foil to an etching treatment, and forming an Al film, an Al and graphite-like carbon mixed layer, and a graphite-like carbon film, thereon in this order to have respective thicknesses of 10 nm, 5 nm and 10 nm.

In this regard, film formation on the metal foil in all of the samples was performed by the aforementioned ion plating method.

Test results on the discharge rate property for the comparative and inventive samples are presented in the following Tables 3 to 13. Further, the capacity maintenance ratio determined at each discharge rate (discharge current value) is illustrated in graph form in FIG. 11.

TABLE 3

| Substrate | Film Configuration | Film thickness [nm] | Discharge Rate (Discharge Current Value) | Discharge Capacity [mAh/g] | Capacity Maintenance Ratio [%] |
| --- | --- | --- | --- | --- | --- |
| Comparative Sample 1 | Plain aluminum foil | (No film) | (No film) | (0.2 C) | 150.0 | 100 |
| | | | (0.5 C) | 136.5 | 91.0 |
| | | | (1.0 C) | 120.8 | 80.5 |
| | | | (2.0 C) | 81.5 | 54.3 |
| | | | (3.0 C) | 43.7 | 29.1 |
| | | | (4.0 C) | 0.5 | 0.3 |
| | | | (5.0 C) | 0.2 | 0.1 |
| | | | (10.0 C) | 0.0 | 0.0 |

TABLE 4

| Substrate | Film Configuration | Film thickness [nm] | Discharge Rate (Discharge Current Value) | Discharge Capacity [mAh/g] | Capacity Maintenance Ratio [%] |
| --- | --- | --- | --- | --- | --- |
| Comparative Sample 2 | Etched foil | (No film) | (No film) | (0.2 C) | 150.3 | 100 |
| | | | (0.5 C) | 142.9 | 95.1 |
| | | | (1.0 C) | 135.7 | 90.3 |
| | | | (2.0 C) | 121.0 | 80.5 |
| | | | (3.0 C) | 109.7 | 73.0 |
| | | | (4.0 C) | 98.0 | 65.2 |
| | | | (5.0 C) | 87.0 | 57.9 |
| | | | (10.0 C) | 28.7 | 19.1 |

TABLE 5

| Substrate | Film Configuration | Film thickness [nm] | Discharge Rate (Discharge Current Value) | Discharge Capacity [mAh/g] | Capacity Maintenance Ratio [%] |
|---|---|---|---|---|---|
| Comparative Sample 3 | Plain aluminum foil | GLC | 20 | (0.2 C) | 149.9 | 100 |
| | | | | (0.5 C) | 143.2 | 95.5 |
| | | | | (1.0 C) | 138.8 | 92.6 |
| | | | | (2.0 C) | 127.9 | 85.3 |
| | | | | (3.0 C) | 115.6 | 77.1 |
| | | | | (4.0 C) | 104.8 | 69.9 |
| | | | | (5.0 C) | 93.9 | 62.6 |
| | | | | (10.0 C) | 44.7 | 29.8 |

TABLE 6

| Substrate | Film Configuration | Film thickness [nm] | Discharge Rate (Discharge Current Value) | Discharge Capacity [mAh/g] | Capacity Maintenance Ratio [%] |
|---|---|---|---|---|---|
| Comparative Sample 4 | Plain aluminum foil | Ti and GLC | 25 | (0.2 C) | 150.2 | 100 |
| | | | (0.5 C) | 143.9 | 95.8 |
| | | | (1.0 C) | 139.8 | 93.1 |
| | | | (2.0 C) | 129.3 | 86.1 |
| | | | (3.0 C) | 120.0 | 79.9 |
| | | | (4.0 C) | 109.1 | 72.6 |
| | | | (5.0 C) | 99.2 | 66.0 |
| | | | (10.0 C) | 57.0 | 37.9 |

35

TABLE 7

| Substrate | Film Configuration | Film thickness [nm] | Discharge Rate (Discharge Current Value) | Discharge Capacity [mAh/g] | Capacity Maintenance Ratio [%] |
|---|---|---|---|---|---|
| Comparative Sample 5 | Etched foil | Ti and GLC | 25 | (0.2 C) | 150.3 | 100 |
| | | | (0.5 C) | 144.3 | 96.0 |
| | | | (1.0 C) | 141.4 | 94.1 |
| | | | (2.0 C) | 132.3 | 88.0 |
| | | | (3.0 C) | 122.0 | 81.2 |
| | | | (4.0 C) | 112.1 | 74.6 |
| | | | (5.0 C) | 102.8 | 68.4 |
| | | | (10.0 C) | 64.3 | 42.8 |

TABLE 8

| Substrate | Film Configuration | Film thickness [nm] | Discharge Rate (Discharge Current Value) | Discharge Capacity [mAh/g] | Capacity Maintenance Ratio [%] |
|---|---|---|---|---|---|
| Comparative Sample 6 | Plain aluminum foil | Al and GLC | 25 | (0.2 C) | 150.1 | 100 |
| | | | (0.5 C) | 144.1 | 96.0 |
| | | | (1.0 C) | 139.9 | 93.2 |

TABLE 8-continued

| Substrate | Film Configuration | Film thickness [nm] | Discharge Rate (Discharge Current Value) | Discharge Capacity [mAh/g] | Capacity Maintenance Ratio [%] |
|---|---|---|---|---|---|
| | | | (2.0 C) | 129.4 | 86.2 |
| | | | (3.0 C) | 120.2 | 80.1 |
| | | | (4.0 C) | 110.1 | 73.4 |
| | | | (5.0 C) | 100.1 | 66.7 |
| | | | (10.0 C) | 58.3 | 38.8 |

TABLE 9

| | Substrate | Film Configuration | Film thickness [nm] | Discharge Rate (Discharge Current Value) | Discharge Capacity [mAh/g] | Capacity Maintenance Ratio [%] |
|---|---|---|---|---|---|---|
| Comparative Sample 7 | Etched foil | Al and GLC | 25 nm | (0.2 C) | 150.2 | 100 |
| | | | | (0.5 C) | 145.5 | 96.9 |
| | | | | (1.0 C) | 142.4 | 94.8 |
| | | | | (2.0 C) | 133.1 | 88.6 |
| | | | | (3.0 C) | 123.6 | 82.3 |
| | | | | (4.0 C) | 113.0 | 75.2 |
| | | | | (5.0 C) | 103.7 | 69.0 |
| | | | | (10.0 C) | 66.0 | 43.9 |

TABLE 10

| | Substrate | Film Configuration | Film thickness [nm] | Discharge Rate (Discharge Current Value) | Discharge Capacity [mAh/g] | Capacity Maintenance Ratio [%] |
|---|---|---|---|---|---|---|
| Inventive Sample 1 | Plain aluminum foil | Ti, Mixed layer, and GLC | 25 | (0.2 C) | 150.1 | 100 |
| | | | | (0.5 C) | 145.7 | 97.1 |
| | | | | (1.0 C) | 141.4 | 94.2 |
| | | | | (2.0 C) | 136.6 | 91.0 |
| | | | | (3.0 C) | 130.7 | 87.1 |
| | | | | (4.0 C) | 126.5 | 84.3 |
| | | | | (5.0 C) | 121.7 | 81.1 |
| | | | | (10.0 C) | 103.6 | 69.0 |

TABLE 11

| | Substrate | Film Configuration | Film thickness [nm] | Discharge Rate (Discharge Current Value) | Discharge Capacity [mAh/g] | Capacity Maintenance Ratio [%] |
|---|---|---|---|---|---|---|
| Inventive Sample 2 | Etched foil | Ti, Mixed layer, and GLC | 25 | (0.2 C) | 150.2 | 100 |
| | | | | (0.5 C) | 148.7 | 99.0 |
| | | | | (1.0 C) | 146.4 | 97.5 |
| | | | | (2.0 C) | 141.9 | 94.5 |
| | | | | (3.0 C) | 136.8 | 91.1 |
| | | | | (4.0 C) | 132.6 | 88.3 |
| | | | | (5.0 C) | 129.8 | 86.4 |
| | | | | (10.0 C) | 113.1 | 75.3 |

TABLE 12

| | Substrate | Film Configuration | Film thickness [nm] | Discharge Rate (Discharge Current Value) | Discharge Capacity [mAh/g] | Capacity Maintenance Ratio [%] |
|---|---|---|---|---|---|---|
| Inventive Sample 3 | Plain aluminum foil | Al, Mixed layer, and GLC | 25 | (0.2 C) | 150.1 | 100 |
| | | | | (0.5 C) | 146.9 | 97.9 |
| | | | | (1.0 C) | 142.7 | 95.1 |
| | | | | (2.0 C) | 138.1 | 92.0 |
| | | | | (3.0 C) | 131.9 | 87.9 |
| | | | | (4.0 C) | 127.6 | 85.0 |
| | | | | (5.0 C) | 123.4 | 82.2 |
| | | | | (10.0 C) | 106.4 | 70.9 |

TABLE 13

| | Substrate | Film Configuration | Film thickness [nm] | Discharge Rate (Discharge Current Value) | Discharge Capacity [mAh/g] | Capacity Maintenance Ratio [%] |
|---|---|---|---|---|---|---|
| Inventive Sample 4 | Etched foil | Al, Mixed layer, and GLC | 25 | (0.2 C) | 150.2 | 100 |
| | | | | (0.5 C) | 148.8 | 99.1 |
| | | | | (1.0 C) | 147.3 | 98.1 |
| | | | | (2.0 C) | 143.1 | 95.3 |
| | | | | (3.0 C) | 138.2 | 92.0 |
| | | | | (4.0 C) | 133.8 | 89.1 |
| | | | | (5.0 C) | 131.7 | 87.7 |
| | | | | (10.0 C) | 114.6 | 76.3 |

As seen in FIG. 11, according to one or more implementations, it is apparent that the inventive samples 1 to 4 each using the current collector of the present disclosure is enhanced in the discharge rate property as compared to the current collectors in the comparative samples 1 to 7.

Further, the capacity maintenance ratios determined as test results on the charge-discharge cycle life property, every time one charge-discharge cycle in each of the comparative samples 1 to 7 and the inventive samples 1 to 4 was completed, are presented in the following Tables 14 and 15, and further illustrated in graph form in FIG. 12.

TABLE 14

| | Comparative Sample 1 | Comparative Sample 2 | Comparative Sample 3 | Comparative Sample 4 | Comparative Sample 5 | Comparative Sample 6 | Comparative Sample 7 |
|---|---|---|---|---|---|---|---|
| 1 (n-th cycle) | 100 | 100 | 100 | 100 | 100 | 100 | 100 |
| 2 | 95.5 | 99.2 | 99.5 | 99.6 | 99.7 | 99.7 | 99.8 |
| 3 | 89.7 | 98.4 | 99.2 | 99.0 | 99.3 | 99.1 | 99.4 |
| 4 | 82.5 | 97.1 | 98.8 | 98.6 | 98.9 | 98.8 | 99.0 |
| 5 | 75.3 | 95.4 | 97.8 | 97.0 | 97.8 | 97.1 | 97.9 |
| 6 | 68.6 | 93.3 | 95.0 | 96.1 | 97.0 | 96.0 | 97.2 |
| 7 | 61.8 | 90.9 | 93.1 | 95.2 | 96.1 | 95.2 | 96.4 |
| 8 | 55.5 | 88.4 | 92.3 | 94.3 | 95.2 | 94.4 | 95.6 |
| 9 | 49.7 | 85.6 | 90.1 | 92.5 | 93.4 | 92.6 | 94.0 |
| 10 | 44.3 | 82.2 | 87.8 | 90.8 | 91.7 | 91.0 | 92.1 |
| 11 | 38.8 | 79.4 | 85.3 | 88.9 | 89.9 | 89.2 | 90.2 |
| 12 | 33.4 | 76.8 | 82.9 | 87.9 | 89.0 | 88.1 | 89.3 |
| 13 | 28.6 | 74.0 | 80.1 | 87.0 | 88.3 | 87.2 | 88.7 |
| 14 | 24.3 | 71.6 | 77.0 | 85.1 | 86.8 | 85.5 | 87.0 |
| 15 | 20.6 | 69.0 | 74.8 | 83.9 | 84.9 | 84.0 | 85.2 |
| 16 | 17.3 | 65.9 | 70.4 | 82.7 | 83.8 | 82.8 | 84.1 |
| 17 | 14.4 | 62.4 | 66.7 | 81.0 | 82.1 | 81.3 | 82.5 |
| 18 | 11.8 | 60.0 | 64.8 | 79.1 | 80.8 | 79.2 | 81.2 |
| 19 | 9.9 | 57.9 | 61.9 | 78.0 | 79.3 | 78.3 | 80.1 |
| 20 | 7.4 | 55.5 | 58.9 | 75.9 | 78.6 | 76.1 | 79.6 |

TABLE 15

| | Inventive Sample 1 | Inventive Sample 2 | Inventive Sample 3 | Inventive Sample 4 |
|---|---|---|---|---|
| 1 (n-th cycle) | 100 | 100 | 100 | 100 |
| 2 | 100.1 | 100.2 | 100.1 | 100.3 |
| 3 | 100.1 | 100.4 | 100.3 | 100.4 |
| 4 | 100.4 | 100.5 | 100.1 | 100.3 |
| 5 | 100.2 | 100.5 | 100.3 | 100.4 |
| 6 | 100.3 | 100.4 | 100.4 | 100.5 |
| 7 | 100.1 | 100.7 | 100.2 | 100.6 |
| 8 | 100.4 | 100.8 | 100.3 | 100.6 |
| 9 | 100.2 | 100.4 | 100.3 | 100.4 |
| 10 | 100.3 | 100.5 | 100.4 | 100.3 |
| 11 | 100.2 | 100.8 | 100.3 | 100.5 |
| 12 | 100.3 | 100.9 | 100.4 | 100.8 |
| 13 | 100.4 | 101.3 | 100.2 | 100.9 |
| 14 | 100.5 | 101.2 | 100.3 | 101.0 |
| 15 | 100.3 | 101.1 | 100.4 | 101.0 |
| 16 | 100.2 | 101.2 | 100.1 | 100.9 |
| 17 | 100.3 | 101.2 | 100.2 | 101.0 |
| 18 | 100.5 | 100.9 | 100.3 | 100.9 |
| 19 | 100.6 | 100.9 | 100.2 | 101.0 |
| 20 | 100.1 | 101.1 | 100.3 | 100.9 |

Figure 12:
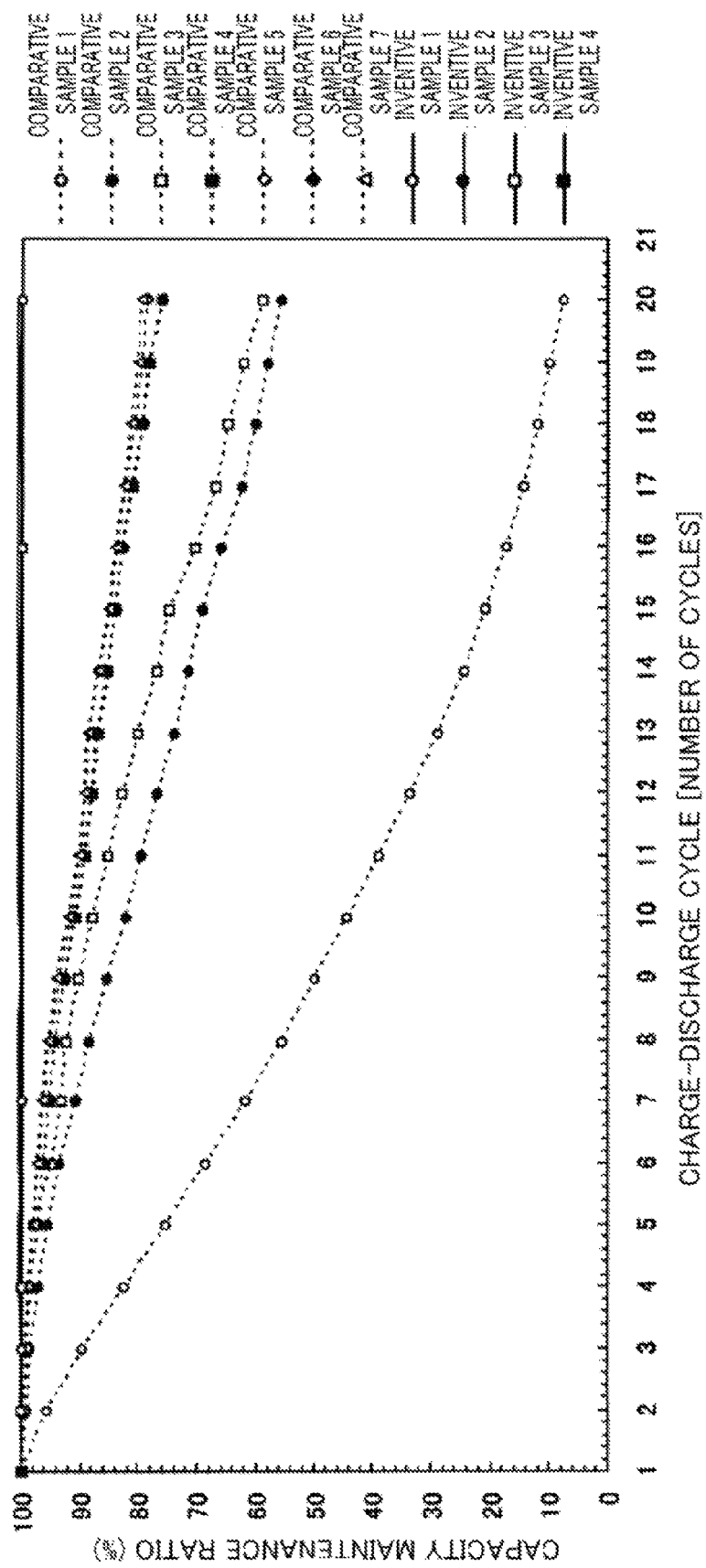
FIG. 12 illustrates a comparison result of charge-discharge cycle lives measured in respective samples of a lithium ion secondary battery using a current collector according to one or more implementations of the present disclosure and a lithium ion secondary battery using a current collector as a comparative sample.

According to one or more implementations, in FIG. 12, as compared to the charge-discharge cycle life property in the battery using the current collectors of comparative samples 1 to 7, wherein a reduction in the capacity maintenance ratio occurs along with an increase in the number of cycles, in any of the inventive samples 1 to 4 each using the current collector of the present disclosure, no reduction in the capacity occurs before 20 cycles, which clearly shows enhancement in the charge-discharge cycle life property.

A result of the SAICAS test for evaluating the effect of surface-roughening of the metal foil with respect to adhesion strength between the current collector and the electrode layer, for the comparative samples 1 and 2, and the inventive samples 1 and 2, is illustrated in FIG. 13. It is evident that the effect of surface-roughening of the metal foil with respect to adhesion strength with the electrode layer is present, irrespective of the presence or absence of a film thereon.

As above, according to one or more implementations, it was verified that an electrode prepared using the current collector of the present disclosure exhibits significantly small deterioration in quality due to usage at a high discharge rate and a large number of repetitive usages. According to one or more implementations, it is believed that such an effect is created based on high electrical conductivity and chemical stability in the interface obtained by the previously mentioned film configuration of the current collector of the present disclosure. According to one or more implementations, it is evident that enhancement in electrical conductivity and chemical stability coming from the film configuration of the present disclosure does not depend on a specific application of the current collector. In view of this, it is assumed that, when the current collector of the present disclosure is used in a negative electrode of a lithium ion secondary battery, or in a positive or negative electrode of an electric double layer capacitor or a hybrid capacitor, quality deterioration can be suppressed in the same manner.

According to one or more implementations, the electrode material of the present disclosure can be utilized as a cathode foil of a wound-type or stacked-type solid electrolytic capacitor. According to one or more implementations, the electrode material of the present disclosure is also usable in various capacitors including an electrolytic capacitor which operates using an electrolytic solution, an electric double layer capacitor, a lithium ion capacitor, a lithium ion battery, a solar battery and others.

According to one or more implementations, the current collector of the present disclosure can be utilized as an electrode of a secondary battery, an electric double layer capacitor or a hybrid capacitor. According to one or more implementations, the current collector of the present disclosure is also usable in a solar battery or the like which is driven using an electrolyte.

EXPLANATION OF CODES

1: cathode foil
2: plain aluminum foil
3: metal layer
4: mixed layer
5: carbon layer
6: wound-type solid electrolytic capacitor
7: anode foil
8: cathode foil
9: separator sheet
10: capacitor element
11: anode terminal
12: cathode terminal
13: aluminum casing
14: sealing rubber
15: metal foil
16: metal layer
17: mixed layer
18: carbon layer
19: current collector (19$a$: positive-side current collector, 19$b$: negative-side current collector)
20: positive electrode layer
21: positive electrode
22: negative electrode layer
23: positive electrode
24: separator
25: electrolyte
26: positive terminal
27: negative terminal
28: lithium ion secondary battery element
29: battery casing
30: lithium ion secondary battery

What is claimed is:

1. A cathode foil for use in a solid electrolytic capacitor having a capacitor element which comprises an anode foil, a cathode foil, a separator provided between the anode and cathode foils, and a solid electrically conductive polymer layer disposed between the anode and cathode foils, wherein the cathode foil comprises:
an aluminum foil having a non-roughened surface;
a metal layer disposed on the aluminum foil and consisting of Ti or Al;
a mixed layer disposed on the metal layer and containing graphite-like carbon and the Ti or Al in a mixed state wherein the graphite-like carbon is carbon having at least an amorphous structure in which a diamond bond as a carbon-carbon bond based on a $sp^3$ hybridized orbital and a graphite bond as a carbon-carbon bond based on a $sp^2$ hybridized orbital exist in a mixed state, wherein a rate of the graphite bond is over one-half; and
a carbon layer disposed on the mixed layer and consisting of graphite-like carbon,
wherein the mixed layer is configured to have a composition which changes from a state containing only the Ti or Al to a state containing only the graphite-like carbon, in a direction from the metal layer to the carbon layer, and
wherein the state containing only the Ti or Al is a carbon-free state.

2. A current collector for an electrode, comprising:
a first electrically conductive layer containing a metal, the first electrically conductive layer disposed on a substrate containing a metal,
a mixed layer containing graphite-like carbon and a substance composing the metal of the first electrically conductive layer in a mixed state, wherein the graphite-like carbon is carbon having at least an amorphous structure in which a diamond bond as a carbon-carbon bond based on a $sp^3$ hybridized orbital and a graphite bond as a carbon-carbon bond based on a $sp^2$ hybridized orbital exist in a mixed state, wherein a rate of the graphite bond is over one-half, and
a second electrically conductive layer consisting of graphite-like carbon,
wherein the mixed layer is configured to have a composition which changes from a state containing only the metal of the substance to a state containing only graphite-like carbon, in a direction from the first electrically conductive layer containing a metal to the second electrically conductive layer, and
wherein the state containing only the metal of the substance is a carbon-free state.

3. The current collector as defined in claim 2, wherein the first electrically conductive layer containing a metal contains at least one selected from the group consisting of Ta, Ti, Cr, Al, Nb, V, W, Hf, Cu, and nitrides of those metals.

4. The current collector as defined in claim 2, wherein the substrate containing a metal is a metal foil consisting of at least one selected from the group consisting of aluminum or aluminum alloy, Ti, Cu, Ni, Hf, and stainless steel.

5. The current collector as defined in claim 2, wherein the substrate containing a metal has a roughened surface.

6. A positive electrode for a non-aqueous electrolytic secondary battery, the positive electrode comprising an electrode layer on the current collector as defined in claim 2, the electrode layer comprising: an active substance including a transition metal oxide or transition metal phosphate compound containing an alkali metal or an alkali earth metal; an electrically conductive assistant; and a binder.

7. A negative electrode for a non-aqueous electrolytic secondary battery, the negative electrode comprising an electrode layer on the current collector as defined in claim 2, the electrode layer comprising: an active substance including at least one selected from the group consisting of a carbon material capable of occluding and releasing an alkali metal ion or alkali earth metal ion, Sn, Si or silicon oxide, S or sulfide, and titanium oxide; an electrically conductive assistant; and a binder.

8. A non-aqueous electrolytic secondary battery comprising the positive electrode as defined in claim 6.

9. An electrode for a non-aqueous electrolytic electric double layer capacitor, the electrode comprising an electrode layer on the current collector as defined in claim 2, the electrode layer comprising: an active substance including activated carbon or carbon nanotube; an electrically conductive assistant; and a binder.

10. A non-aqueous electrolytic electric double layer capacitor comprising a positive electrode and a negative electrode, wherein the electrode as defined in claim 9 is used as at least one of the positive and negative electrodes.

11. A positive electrode for a non-aqueous electrolytic hybrid capacitor, the positive electrode comprising an electrode layer on the current collector as defined in claim 2, the electrode layer comprising: an active substance including activated carbon or carbon nanotube; an electrically conductive assistant; and a binder.

12. A negative electrode for a non-aqueous electrolytic hybrid capacitor, the negative electrode comprising an electrode layer on the current collector as defined in claim 2, the electrode layer comprising: an active substance including at least one selected from the group consisting of a carbon material capable of occluding and releasing an alkali metal ion or alkali earth metal ion, Sn, Si or silicon oxide, S or sulfide, and titanium oxide; an electrically conductive assistant; and a binder.

13. A non-aqueous electrolytic hybrid capacitor comprising the positive electrode as defined in claim 11.

14. A non-aqueous electrolytic secondary battery comprising the negative electrode as defined in claim 7.

15. A non-aqueous electrolytic hybrid capacitor comprising the negative electrode as defined in claim 12.

16. The current collector as defined in claim 2, wherein the graphite-like carbon includes a phase having a crystal structure partially composed of a graphite structure.

* * * * *